US012769719B2

(12) United States Patent
Perkov

(10) Patent No.: US 12,769,719 B2
(45) **Date of Patent: *Oct. 20, 2026**

(54) FILTERING AND SEARCHING TREE STRUCTURES USING FORM FACTORS

(71) Applicant: Oracle International Corporation, Redwood Shores, CA (US)

(72) Inventor: Evgueni Perkov, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/096,033

(22) Filed: Mar. 31, 2025

(65) Prior Publication Data

US 2025/0252091 A1 Aug. 7, 2025

Related U.S. Application Data

(63) Continuation of application No. 17/987,697, filed on Nov. 15, 2022, now Pat. No. 12,353,385.

(51) Int. Cl.
*G06F 16/22* (2019.01)
*G06F 16/2457* (2019.01)

(52) U.S. Cl.
CPC ...... *G06F 16/2246* (2019.01); *G06F 16/2457* (2019.01)

(58) Field of Classification Search
CPC .......................... G06F 16/2246; G06F 16/2457
See application file for complete search history.

(56) References Cited

U.S. PATENT DOCUMENTS

2015/0278396 A1* 10/2015 Vasilyeva ........... G06F 16/2453 707/769
2017/0277687 A1* 9/2017 Sammis .............. G06F 16/2246
2021/0191919 A1* 6/2021 Perkov .............. G06F 16/24558

* cited by examiner

*Primary Examiner* — Ken Hoang
(74) *Attorney, Agent, or Firm* — Trellis IP Law Group, PC

(57) ABSTRACT

A computer-implemented method to determine form factors of a tree includes building an input tree, wherein the input tree includes nodes. The method further includes implementing a first top-down pass to determine a universal number for each node in the input tree. The method further includes implementing a second top-down pass to determine form factors for each node of the input tree, wherein a form factor includes a depth and a width of the tree with a root in a corresponding node. The method further includes storing the form factors as part of node metadata or in a separate table.

20 Claims, 17 Drawing Sheets

2000

Query Result

| # | HashID | Node Number | Depth | Width | Payload Node ID | Content |
|---|---|---|---|---|---|---|
| 1 | ad78d7288ff2b4bfc9a41a6f9505ldd5 | 1133 | 29 | 411 | 76149770170 | condition exists_cond |
| 2 | ad78d7288ff2b4bfc9a41a6f9505ldd5 | 17258 | 21 | 197 | 414034847411 | condition exists_cond |
| 3 | ad78d7288ff2b4bfc9a41a6f9505ldd5 | 9940 | 22 | 182 | 9483287791594 | condition exists_cond |
| 4 | ad78d7288ff2b4bfc9a41a6f9505ldd5 | 2321258 | 24 | 211 | 157632231167 | condition exists_cond |
| 5 | ad78d7288ff2b4bfc9a41a6f9505ldd5 | 159053 | 18 | 144 | 10110353016994 | condition exists_cond |
| 6 | ad78d7288ff2b4bfc9a41a6f9505ldd5 | 861714 | 21 | 192 | 2572685410711 | condition exists_cond |
| 7 | ad78d7288ff2b4bfc9a41a6f9505ldd5 | 4205 | 26 | 387 | 2611340116189 | condition exists_cond |
| 8 | ad78d7288ff2b4bfc9a41a6f9505ldd5 | 79533 | 17 | 152 | 10771777980724 | condition exists_cond |

2005

FIG 20

FILTERING AND SEARCHING TREE STRUCTURES USING FORM FACTORS

CROSS REFERENCES TO RELATED APPLICATIONS

This application is a continuation of the following application, U.S. patent application Ser. No. 17/987,697, entitled METHOD FOR FAST AND EFFICIENT COMPUTING OF TREE FORM-FACTORS, filed on Nov. 15, 2022, which is hereby incorporated by reference as if set forth in full in this application for all purposes.

BACKGROUND

Many applications, such as enterprise database applications, business analytics software, and cloud-based concurrent processing applications, employ relational databases where the data is stored in hierarchical trees. These applications need efficient tree operations to operate, such as comparing tree structures, adding nodes, searching the true structures, joining portions or all of the tree structures, etc.

As hierarchical trees increase in size, the task of searching for relatively large sample sub-trees may become too expensive and time consuming. For example, finding a set of performance anti-patterns in a huge corpus of complex Structured Query Language (SQL) queries may take prohibitively long to report the results.

SUMMARY

A computer-implemented method to determine form factors of a tree includes building an input tree, wherein the input tree includes nodes. The method further includes implementing a first top-down pass to determine a universal number for each node in the input tree. The method further includes implementing a second top-down pass to determine form factors for each node of the input tree, wherein a form factor includes a depth and a width of the tree with a root in a corresponding node. The method further includes storing the form factors as part of node metadata or in a separate table.

In some embodiments, the first top-down pass comprises: generating a work queue that includes a pointer to a root node of the input tree, assigning the root node a root universal number of 1, determining a list of children of the root node, shifting each child node in the list of child nodes to the work queue while enumerating the list of child nodes of the root node to determine a child universal number for each of the child nodes until the work queue is empty, and generating an output tree and a sorted list of leaf nodes of the output tree. In some embodiments, the work queue is based on a breadth-first walking method. In some embodiments, the second top-down pass comprises: computing the form factors for each of the nodes of the input tree based on the universal number of each node. In some embodiments, the second top-down pass comprises: generating a bitmap matrix of strings from each of the leaf nodes, determining the form factor for the root node, and determining the form factors for corresponding nodes at each subsequent level of the input tree based on the bitmap matrix, wherein the depth corresponds to a number of edges between a current node and a last leaf node in a path and wherein the width corresponds to a maximum number of nodes at a same level in a subtree. In some embodiments, the second top-down pass comprises: generating a bitmap matrix of strings from each of the leaf nodes, determining the form factor for the root node, and determining the form factors for corresponding nodes at each subsequent level of the input tree based on the bitmap matrix, wherein the depth corresponds to a number of zeros to a right of a pointer in one or more corresponding strings in the bitmap matrix and wherein the width corresponds to the number of corresponding strings in the bitmap matrix for a corresponding node. In some embodiments, the method further includes applying a split at level method to determine whether a string in the bitmap matrix is spent and responsive to determining that the string in the bitmap matrix is spent, discarding the string for further processing. In some embodiments, the method further includes receiving a search query with a sample tree structure, determining a corresponding form factor for a sample root node of the sample tree structure, and filtering a database of trees by identifying matching nodes that match the corresponding form factor of the sample root node. In some embodiments, the method further includes searching a subset of trees in the database of trees that correspond to the matching nodes for subtrees that match the sample tree structure.

In some embodiments, a device comprises a processor and a memory coupled to the processor, with instructions stored thereon that, when executed by the processor, cause the processor to perform operations comprising: building an input tree, wherein the input tree includes nodes, implementing a first top-down pass to determine a universal number for each node in the input tree, implementing a second top-down pass to determine form factors for each node of the input tree, wherein a form factor includes a depth and a width of the tree with a root in a corresponding node, and storing the form factors as part of node metadata or in a separate table.

In some embodiments, the first top-down pass comprises: generating a work queue that includes a pointer to a root node of the input tree, assigning the root node a root universal number of 1, determining a list of children of the root node, shifting each child node in the list of child nodes to the work queue while enumerating the list of child nodes of the root node to determine a child universal number for each of the child nodes until the work queue is empty, and generating an output tree and a sorted list of leaf nodes of the output tree. In some embodiments, the work queue is based on a breadth-first walking method. In some embodiments, the second top-down pass comprises: computing the form factors for each of the nodes of the input tree based on the universal number of each node. In some embodiments, the second top-down pass comprises: generating a bitmap matrix of strings from each of the leaf nodes, determining the form factor for the root node, and determining the form factors for corresponding nodes at each subsequent level of the input tree based on the bitmap matrix, wherein the depth corresponds to a number of edges between a current node and a last leaf node in a path and wherein the width corresponds to a maximum number of nodes at a same level in a subtree. In some embodiments, the second top-down pass comprises: generating a bitmap matrix of strings from each of the leaf nodes, determining the form factor for the root node, and determining the form factors for corresponding nodes at each subsequent level of the input tree based on the bitmap matrix, wherein the depth corresponds to a number of zeros to a right of a pointer in one or more corresponding strings in the bitmap matrix and wherein the width corresponds to the number of corresponding strings in the bitmap matrix for a corresponding node.

In some embodiments, a non-transitory computer-readable medium with instructions stored thereon that, when executed by one or more computers, causes the one or more computers to perform operations, the operations comprising: building an input tree, wherein the input tree includes nodes, implementing a first top-down pass to determine a universal number for each node in the input tree, implementing a second top-down pass to determine form factors for each node of the input tree, wherein a form factor includes a depth and a width of the tree with a root in a corresponding node, and storing the form factors as part of node metadata or in a separate table.

In some embodiments, the first top-down pass comprises: generating a work queue that includes a pointer to a root node of the input tree, assigning the root node a root universal number of 1, determining a list of children of the root node, shifting each child node in the list of child nodes to the work queue while enumerating the list of child nodes of the root node to determine a child universal number for each of the child nodes until the work queue is empty, and generating an output tree and a sorted list of leaf nodes of the output tree. In some embodiments, the work queue is based on a breadth-first walking method. In some embodiments, the second top-down pass comprises: computing the form factors for each of the nodes of the tree based on the universal number of each node. In some embodiments, the second top-down pass comprises: generating a bitmap matrix of strings from each of the leaf nodes, determining the form factor for the root node, and determining the form factors for corresponding nodes at each subsequent level of the input tree based on the bitmap matrix, wherein the depth corresponds to a number of edges between a current node and a last leaf node in a path and wherein the width corresponds to a maximum number of nodes at a same level in a subtree.

The application advantageously describes a two step top-down pass for identifying universal numbers and form factors for each node in a tree. The form factors are saved as metadata that is part of the tree or in a separate table associated with the tree. The form factors are used in tree search operations or comparison operations to significantly narrow the search field down by identifying root nodes for sub-trees that are more likely to match the candidate tree.

A further understanding of the nature and the advantages of particular embodiments disclosed herein may be realized by reference of the remaining portions of the specification and the attached drawings.

BRIEF DESCRIPTION OF THE DRAWINGS

FIG. 20 is a block diagram that illustrates an example search query, according to some embodiments described herein.

DETAILED DESCRIPTION OF EMBODIMENTS

Network Environment 100

Figure 1:
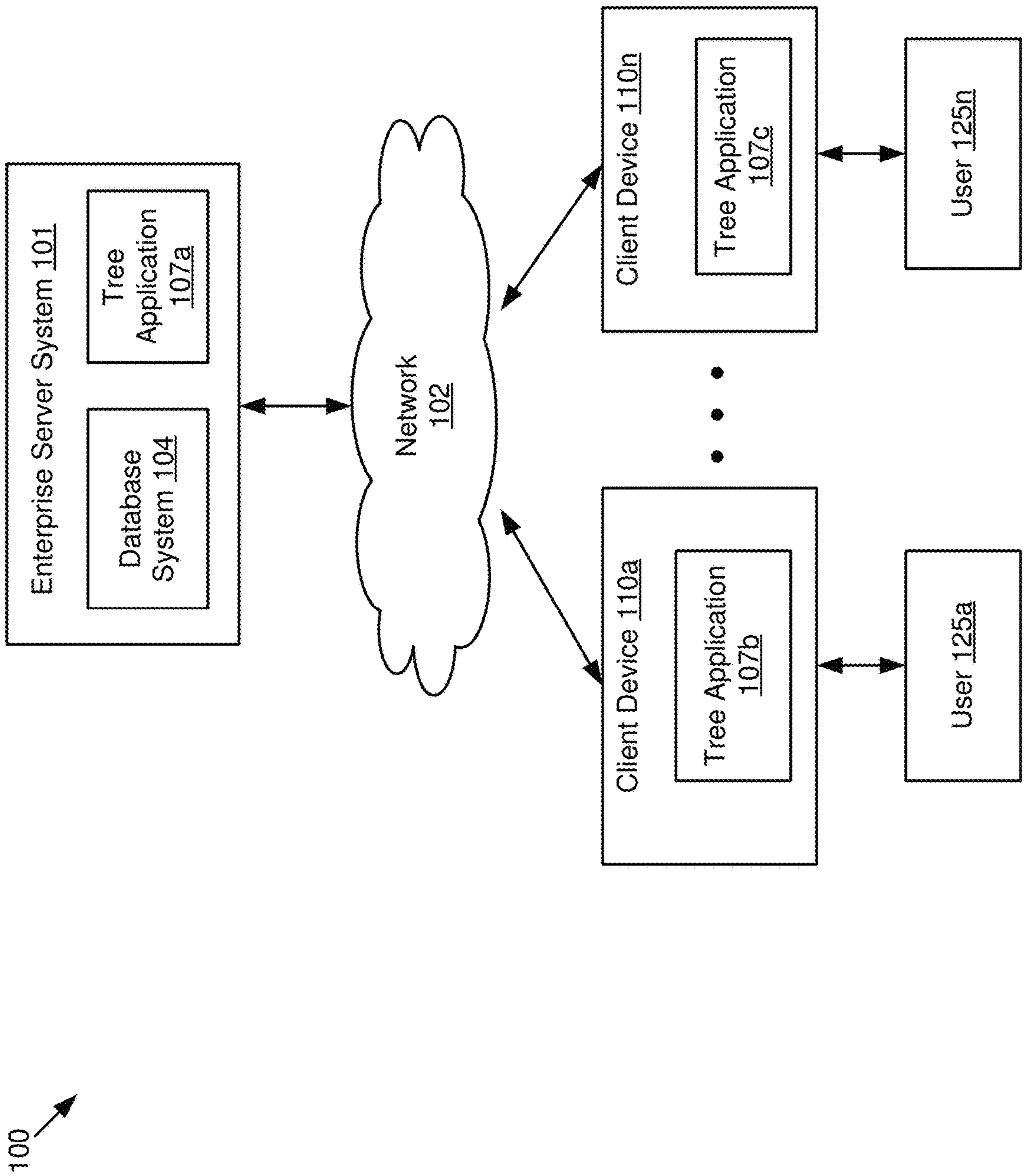
FIG. 1 is a block diagram of an example network environment to determine form factors for trees, according to some embodiments described herein.

FIG. 1 illustrates a block diagram of an example environment 100 to determine form factors for trees. In some embodiments, the environment 100 includes a server system 101, client devices 110*a* . . . *n*, and a network 102. Users 125*a* . . . *n* may be associated with the respective client devices 110*a* . . . *n*. In FIG. 1 and the remaining figures, a letter after a reference number, e.g., "107*a*," represents a reference to the element having that particular reference number. A reference number in the text without a following letter, e.g., "107," represents a general reference to embodiments of the element bearing that reference number. In some embodiments, the server system 101 is a standalone server or is implemented within a single system, such as a cloud server, while in other embodiments, the server system 101 is implemented within one or more computing systems, servers, data centers, etc.

The server system 101 includes one or more servers that each include a processor, a memory, and network communication hardware. In some embodiments, the server system 101 is a hardware server. The server system 101 is communicatively coupled to the network 102. In some embodiments, the server system 101 sends and receives data to and from the client devices 110.

In some embodiments, the server system 101 includes a database system 104 and a tree application 107*a*. The server system 101 may be an enterprise server system that that uses a database system 104 to manage databases. For example, the database system 104 may include one or more relational databases, Relational DataBase Management Systems (RDBMSs), etc. In some embodiments, the tree application 107 includes Artificial Intelligence (AI) applications, Just-In-Time (JIT) compilation systems, automated code optimization systems, static code analyzers, semantic patterns processors, advances search engines, Computer Aided Design (CAD) software, Customer Relationship Management (CRM) platforms, Bill of Materials (BIL) applications, Enterprise Resource Planning (ERP) applications, cloud-based Integrated Development Environments (IDEs), social networking platforms, etc.

The tree application 107*a* may generate trees with form factors for the database system 104. In some embodiments, the tree application 107*a* is part of the database system 104.

The client device 110 may be a computing device that includes a memory, a hardware processor, and a microphone. For example, the client device 110 may include a mobile device, a tablet computer, a mobile telephone, a mobile email device, or another electronic device capable of accessing a network 102.

Client device 110*a* includes tree application 107*b* and client device 110*n* includes tree application 107*c*. In some embodiments, the tree application 107 on the client device 110 generates a tree and determines form factors for each node in the tree. In some embodiments, the tree application 107 on the client device 110 provides queries to the tree application 107*a* stored on the server system 101, which generates the trees with form factors and provides search results to the tree application 107 on the client device. In some embodiments, the tree application 107 on the client device 110 may be implemented via one or more web services and/or Application Programming Interfaces (APIs).

In the illustrated embodiment, the entities of the environment 100 are communicatively coupled via a network 102. The network 102 may include any combination of local area and/or wide area networks, using both wired and/or wireless communication systems. In one embodiment, the network 102 uses standard communications technologies and/or protocols. For example, the network 102 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 102 include multiprotocol label switching (MPLS), transmission control protocol/Internet protocol (TCP/IP), hypertext transport protocol (HTTP), simple mail transfer protocol (SMTP), file transfer protocol (FTP), and User Datagram Protocol (UDP). Data exchanged over the network 102 may be represented using any suitable format, such as hypertext markup language (HTML) or extensible markup language (XML). In some embodiments, all or some of the communication links of the network 102 may be encrypted using any suitable techniques.

Computing Device Example 200

Figure 2:
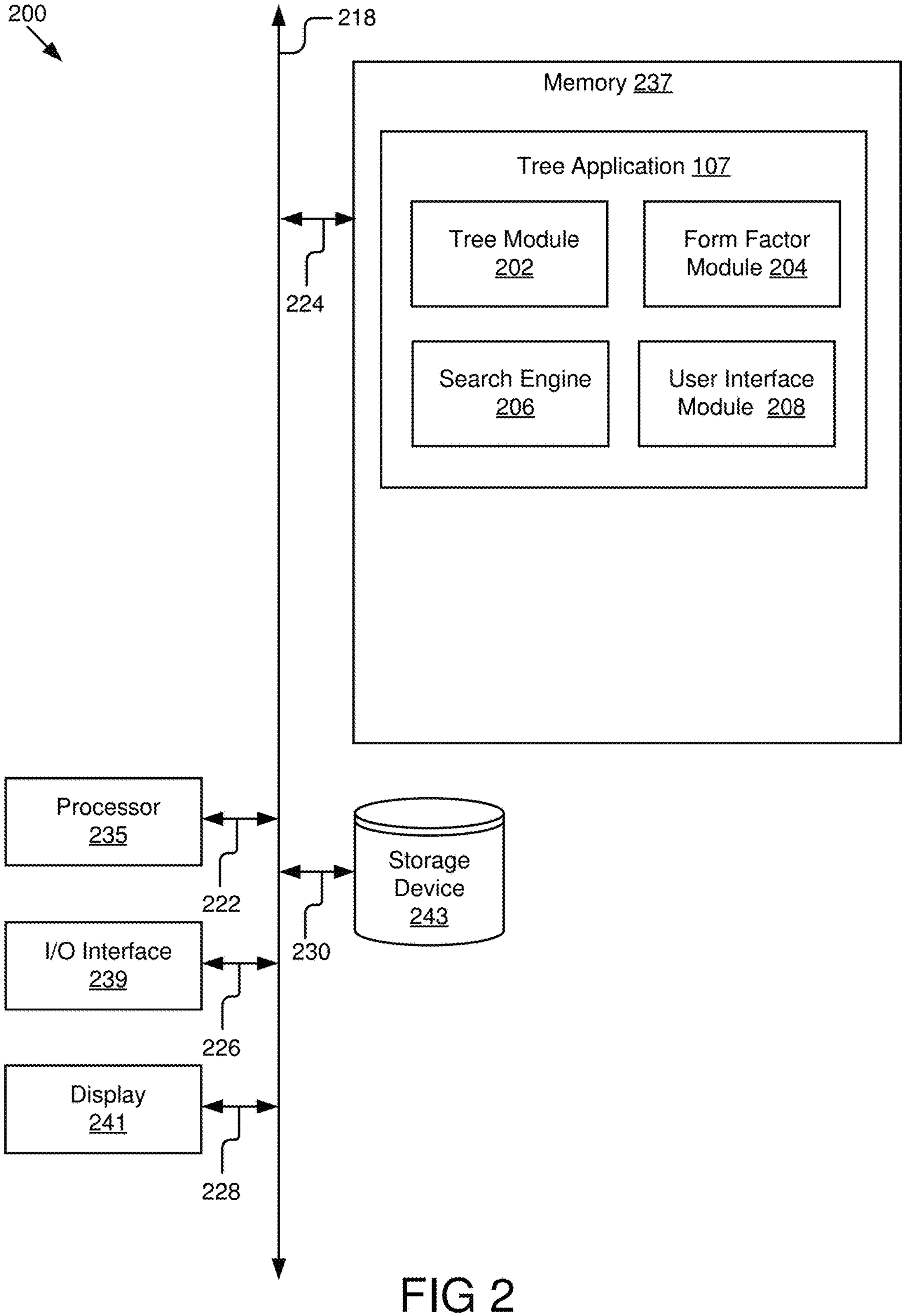
FIG. 2 is a block diagram of an example computing device to determine form factors for trees, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the server system 101. In some embodiments, the computing device 200 is the client device 110.

In some embodiments, computing device 200 includes a processor 235, a memory 237, an Input/Output (I/O) interface 239, a display 241, and a storage device 243. Depending on whether the computing device 200 is the server system 101 or the client device 110, some components of the computing device 200 may not be present. For example, in instances where the computing device 200 is the server system 101, the computing device may not include the display 241. In some embodiments, the computing device 200 includes additional components not illustrated in FIG. 2.

The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, and the storage device 247 may be coupled to the bus 218 via signal line 230.

The processor 235 includes an arithmetic logic unit, a microprocessor, a general-purpose controller, or some other processor array to perform computations and provide instructions to a display device. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the tree application 107, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 247), and input/output devices can communicate via I/O interface 239. In another example, the I/O interface 239 can receive data from the server system 101 and deliver the data to the tree application 107 and components of the tree application 107. In some embodiments, the I/O interface 239 can connect to interface devices such as input devices (keyboard, microphone, sensors, etc.) and/or output devices (display 241, speaker, etc.).

Some examples of interfaced devices that can connect to I/O interface 239 can include a display 241 that can be used to display content as described herein, and to receive touch (or gesture) input from a user. Display 241 can include any suitable display device such as a liquid crystal display (LCD), light emitting diode (LED), or plasma display screen, cathode ray tube (CRT), television, monitor, touch-screen, three-dimensional display screen, or other visual display device.

The storage device 247 stores data related to the tree application 107. The storage device 247 may be a non-transitory computer readable memory. The storage device 247 may store data associated with the tree application 107, such as trees, form factors, metadata, etc.

Example Tree Application 107

FIG. 2 illustrates a computing device 200 that executes an example tree application 107 that includes a tree module 202, a form factor module 204, a search engine 206, and a user interface module 208. Although the components of the tree application 107 are illustrated as being part of the same tree application 107, persons of ordinary skill in the art will recognize that the components may be implemented by different computing devices 200. For example, the tree module 202, the form factor module 204, and the search engine 206 may be part of the enterprise server system 101 and the user interface module 208 may be part of a client device 110.

The tree module 202 generates or receives a tree. In some embodiments, the tree module 202 includes a set of instructions executable by the processor 235 to generate or receive the tree. In some embodiments, the tree module 202 is stored in the memory 237 of the computing device 200 and can be accessible and executable by the processor 235.

In some embodiments, the tree module 202 generates a tree based on information provided by a user or by another application, such as a database system. In some embodiments, the tree module 202 receives the tree from another source. For example, the tree module 202 may receive a tree of on organizational hierarchy that was generated by a different application.

In some embodiments, a tree is any data structure characterized by one or more hierarchies. A hierarchy may be any arrangement of data, where different data in the arrangement exhibits superior or subordinate relationships with other data. A tree hierarchy may be a hierarchy characterized by a group of related nodes that are related, for example, by attributes, dimensions, labels, data objects, etc., which may be arranged in levels where higher levels are characterized by nodes that exhibit superior relationships relative to nodes of lower levels. Higher level nodes are called parents, grandparents, etc., of related lower-level nodes, e.g., child nodes, grandchild nodes, etc.

A tree hierarchy, also called a tree structure, may exhibit nodes corresponding to data dimensions and/or leaf data. Leaf data may represent data of the lower-level node (called a leaf node) along any branch of the tree structure, such that the leaf node lacks any child nodes.

The entire structure of the tree hierarchy can represent a collection of branches. A branch may be any path of the structure between nodes. Generally, the branches discussed herein represent paths from a top level or parent node to sub-nodes, e.g., child nodes, grandchild nodes, etc. Nodes at the same level of a hierarchy are called sibling nodes.

Depending upon the context in which the terms tree and hierarchy are employed, a tree may refer to both the hierarchy describing the tree and the data in the tree. The term hierarchy may refer to the particular structure or architecture of the tree. However, in certain instances, a particular tree may be referred to by the nature of its structure, i.e., its hierarchy. Furthermore, in certain contexts, the terms tree and tree structure are employed interchangeably to refer to both the hierarchical structure of a given tree and the data stored therein or maintained in association with nodes thereof.

Figure 3:
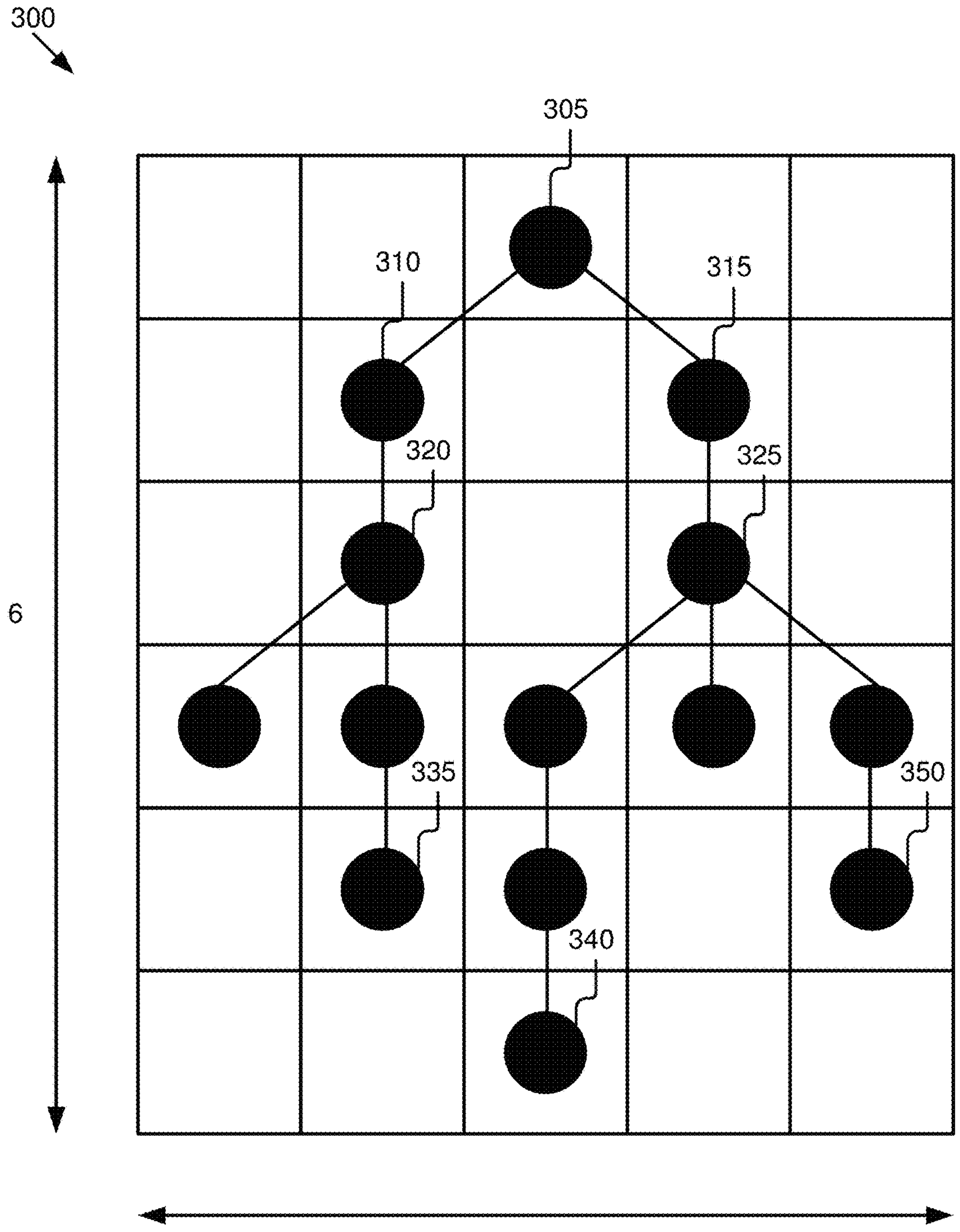
FIG. 3 is a block diagram that illustrates an example tree in a grid structure, according to some embodiments described herein.

Turning to FIG. 3, a block diagram 300 of an example tree in a grid structure is illustrated. The tree structure is characterized by a hierarchy that includes a root node 305, which acts as a parent of immediate subnodes 310, 315, and as a grandparent of other nodes 320, 325. The tree also includes leaf nodes 335, 340, 350, which have no younger siblings. The leaf nodes 335, 340, 350 represent the ends of their respective branches.

In some embodiments, the tree module 202 generates the tree along with metadata structures. The metadata describes the immediate familial relationship (e.g., provides information indicating whether or not a given node is a child and/or a sibling of a particular node), and may also incorporate metadata of any parent node, thereby incorporating a description of an entire branch of the tree structure from the root node 305 to the particular node.

The form factor module 204 determines form factors for a tree. In some embodiments, the form factor module 204 includes a set of instructions executable by the processor 235 to determine the form factors. In some embodiments, the form factor module 204 is stored in the memory 237 of the computing device 200 and can be accessible and executable by the processor 235.

In some embodiments, the form factor module 204 receives the tree from the tree module 202 and computes the form factors during build time. In some embodiments, the form factor module 204 receives a pointer to the tree's root node from the tree module 202. The form factor module 204 accepts any tree including a heterogeneous tree built with nodes of different types. In some embodiments, the form factor module 204 accepts a tree if the tree supports the following operations: a nodeParent( ), which returns a pointer to the parent of a current node, and nodeChildren( ), which returns a sorted list of children of a current node.

The form factor module 204 computes form factors for each node in a tree. A form factor of a tree is represented by a pair of non-negative integer numbers that represent depth and width (d, w): $d \geq 0$, $w > 0$. The form factor of a leaf node (L) is (0, 1). The width is equal to the length of the longest path coming out of N. For an internal (non-leaf) node (N), the depth in the pair equals the count of distinct paths originating from that node and extending to all leaf nodes connected to N via those paths.

A tree with form factor ($n \times m$) can be fully covered by an $n \times m$ grid so that each node of the tree gets its own cell. For any smaller grid, however, two or more nodes would have to share a single cell. Depth is a level of the most-bottom leaf node connected to the node N, where the level of the node Nis 0. In other words, while traversing the longest path, the edges are counted rather than the nodes. Therefore, referring back to FIG. 3, the form factor module 204 computes a form factor of (5, 5).

Figure 4:
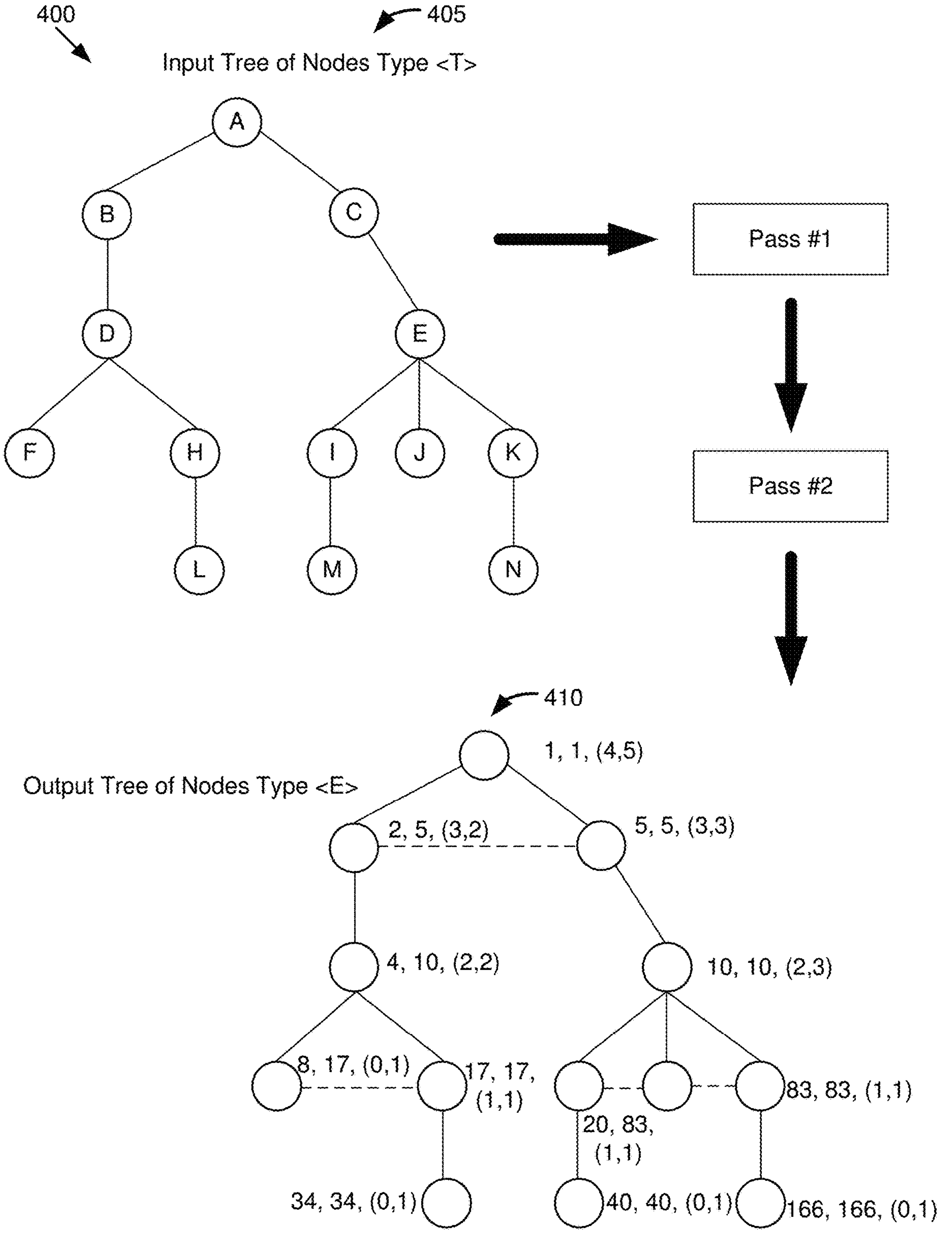
FIG. 4 is a block diagram that illustrates examples of an input tree and an output tree, according to some embodiments described herein.

The form factor module 204 executes two top-down passes to determine the universal number and the form factor of each node. FIG. 4 is a block diagram 400 of an example input tree of nodes type <T> 405 and an output tree of nodes type <E> 410. The form factor module 204 generates an output tree 410 where each node includes a universal number, a semantic number, and form factors where the form factor is defined as (depth, width) of the node. For example, the first node has "1, 1 (4, 5)" next to it. The first number 1 is the universal number, the second number 1 is the semantic number, the depth is 4, and the width is 5.

In some embodiments, the form factor module 204 calculates the universal number during the first pass and determines the semantic number based on the universal number. The universal number is based on an ordered version of the tree where the number is dependent on the paths walked in the tree. The semantic number is based on an unordered tree where the order of traversal is unimportant. The semantic number achieves this goal by making each node in a particular level the same number. For example, the semantic number for node B and node C is 5, the semantic number for node F and node H is 17, etc.

The form factor module 204 identifies each leaf node (i.e., each node that does not have children) and adds the leaf nodes into a list. During the second pass, the form factor module 204 determines the form factor for each node.

Figure 5:
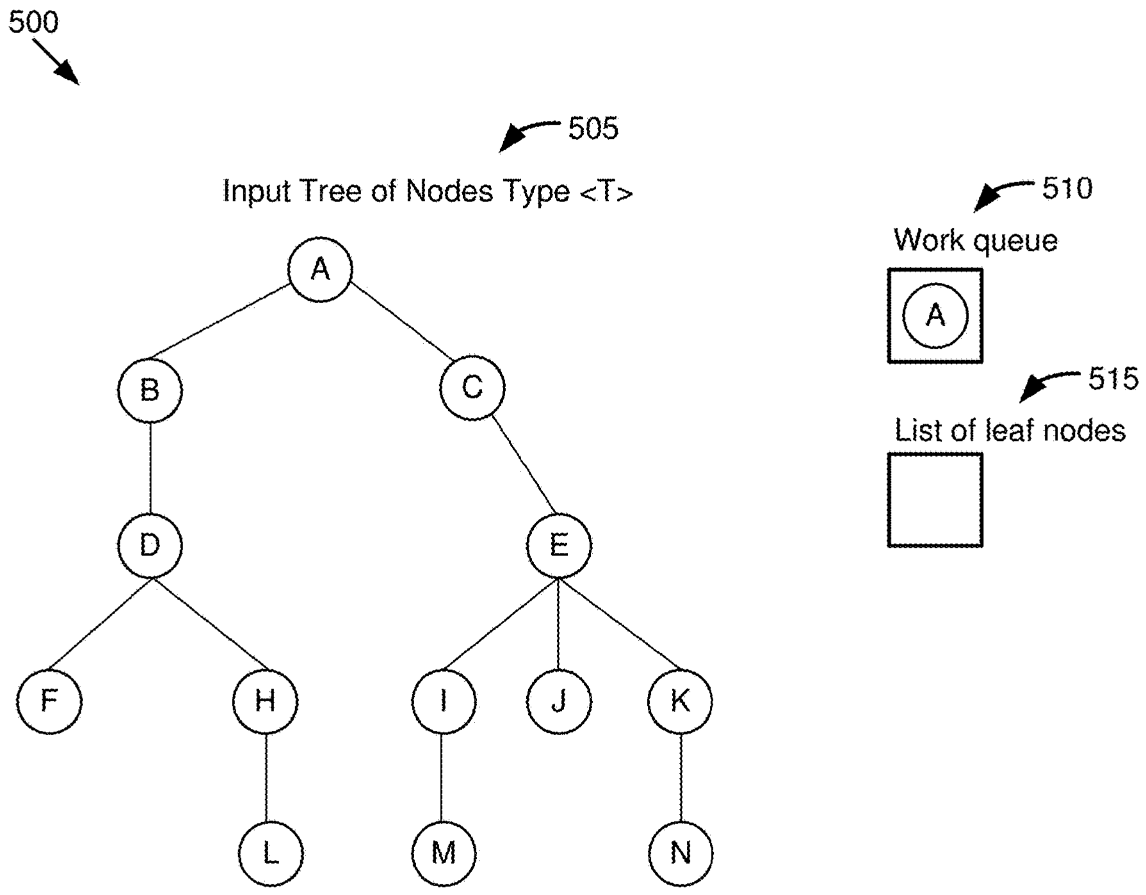
FIG. 5 is a block diagram that illustrates an example beginning of a top-down first pass, according to some embodiments described herein.

The form factor module 204 executes a top-down pass while using two auxiliary data structures: a work queue and a list of leaf nodes. FIG. 5 is a block diagram 500 that illustrates an example beginning of a top-down first pass of an input tree 505. In the beginning, a work queue 510 is populated with a pointer to the root node A of the tree. The pointer is shifted from the right end of the work queue and node A is assigned universal number 1 and semantic number 1. The list of leaf nodes 515 is empty because the form factor module 204 has not yet reached a leaf node.

Next, the form factor module 204 obtains a sorted list of node A's children and passes the sorted list to a routine along with node A's universal number (i.e., 1). In some embodiments, the routine is an enumerate routine. The enumerate routine computes universal and semantic numbers for each node.

Figure 6:
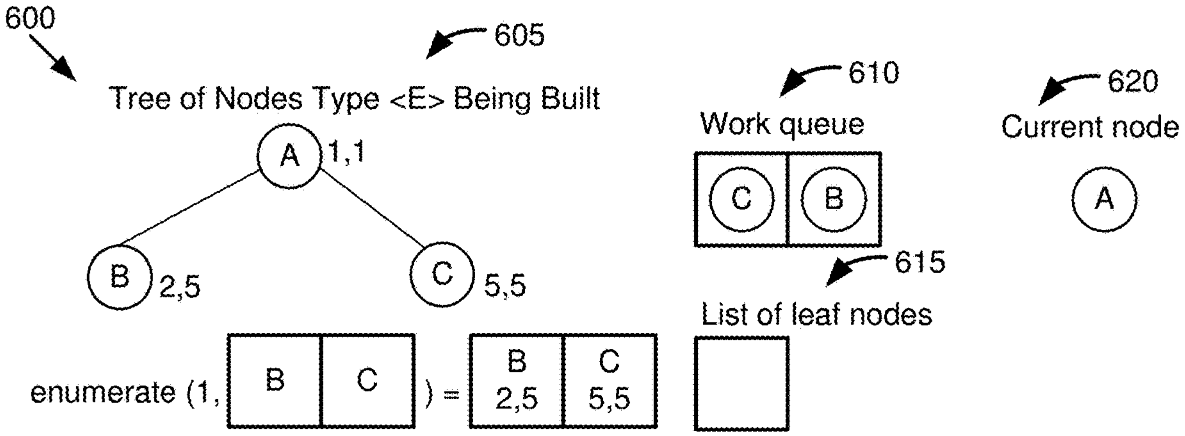
FIG. 6 is a block diagram that illustrates step two of the top-down first pass, according to some embodiments described herein.

The form factor 204 shifts the modified list of children (of output type <E>) one by one to the work queue. FIG. 6 is a block diagram 600 that illustrates an example step two of the top-down first pass. In FIG. 5, the form factor module 204 processed node A in the work queue 510 and in FIG. 6, the form factor 204 shifts the pointer from the right end of the work queue 610 and the form factor 204 processes node B. The form factor module 204 identifies the list of children for node B, which is node D. The work queue 610 also includes node C as the next node to be processed by the form factor module 204. The form factor module 204 builds a tree of nodes type <E> 605 with nodes A, B, and C. The list of leaf nodes 615 is empty because the form factor module 204 has not yet reached a leaf node.

The form factor module 204 applies the enumerate routine to compute pairs using parent node number 1 for node B and node C. The universal number for node B is 2 and the semantic number is 5. The universal number for node C is 5 and the semantic number is 5.

Figure 7:
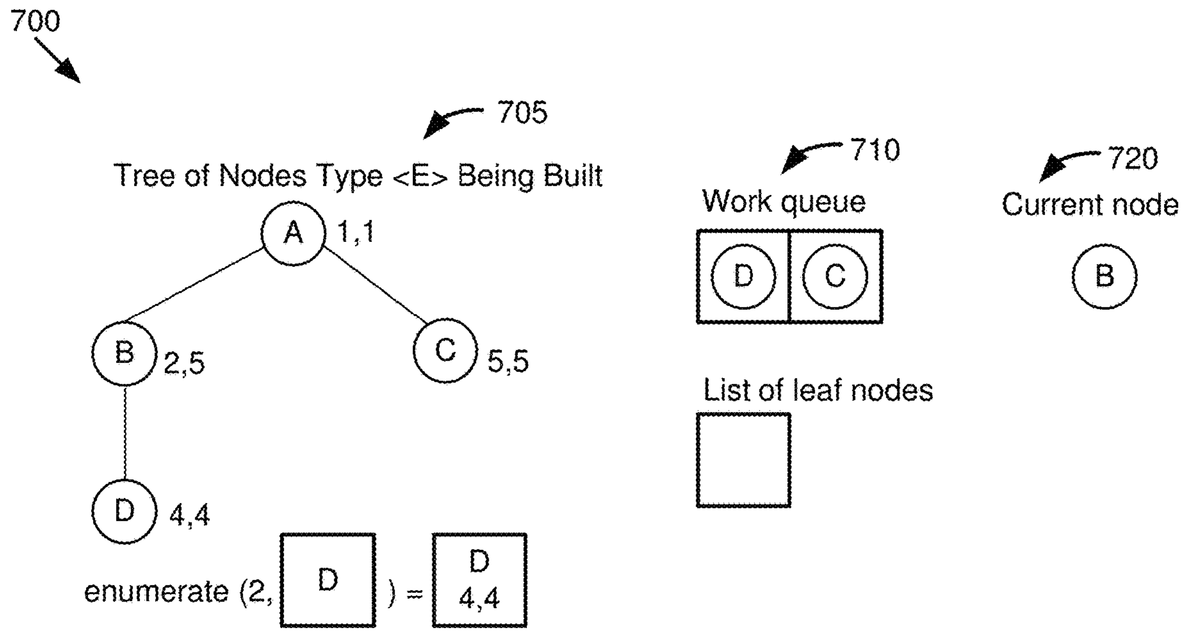
FIG. 7 is a block diagram that illustrates adding node D to an output tree, according to some embodiments described herein.

The form factor module 204 applies the enumerate routine to compute a pair (universal number, semantic number) using parent node number 2 for node B. FIG. 7 is a block diagram 700 that illustrates an example addition of node D to an output tree of type <E> that is being built 705. Once the current node B 720 has been processed, the form factor module 204 processes node C and then node D in the work queue 710.

The form factor module 204 applies the enumerate routine to compute pairs using parent node number 2 for node D. The form factor module 204 applies the enumerate routine to node D to determine the universal number 4 and the semantic number 4.

Figure 8:
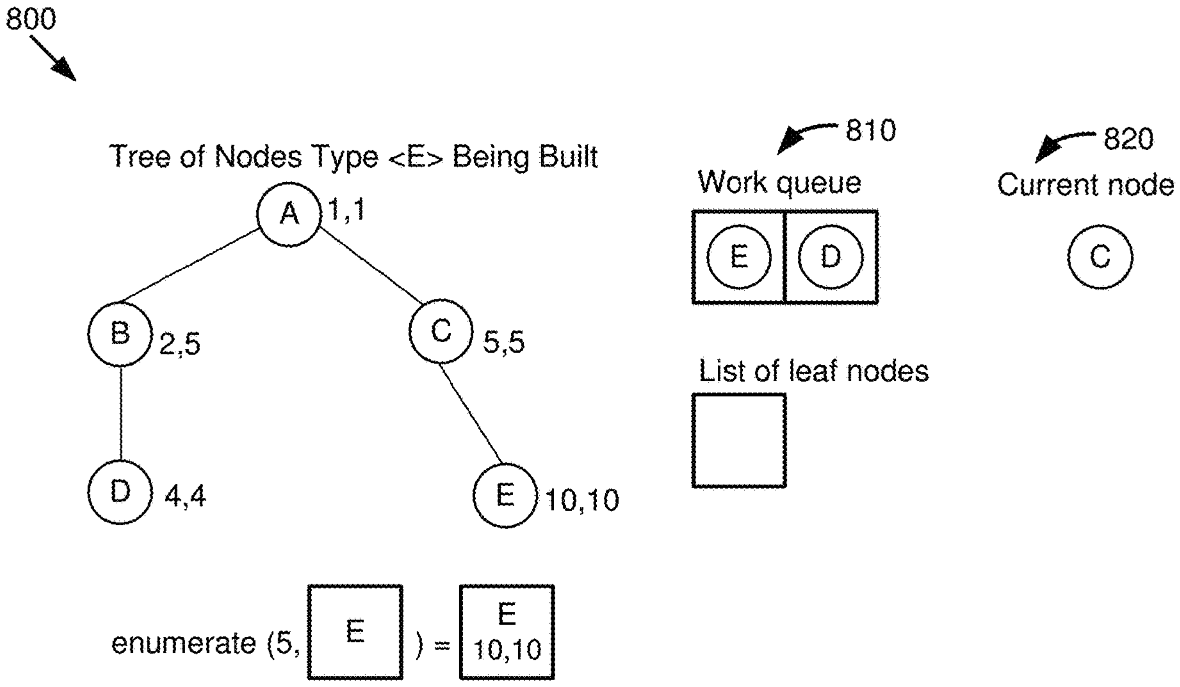
FIG. 8 is a block diagram that illustrates adding node E to the output tree, according to some embodiments described herein.

The form factor module 204 continues walking down the input tree. In this example, the form factor module 204 uses a breadth-first walking method, but other methods are possible. FIG. 8 is a block diagram 800 that illustrates an example addition of node E to the output tree. Once the current node C 820 has been processed, the form factor module 204 processes node D and node E in the work queue 810.

The form factor module 204 applies the enumerate routine to compute a pair using parent node number 5 for node C. The enumerate routine for node E computes universal number 10 and the semantic number 10.

Figure 9:
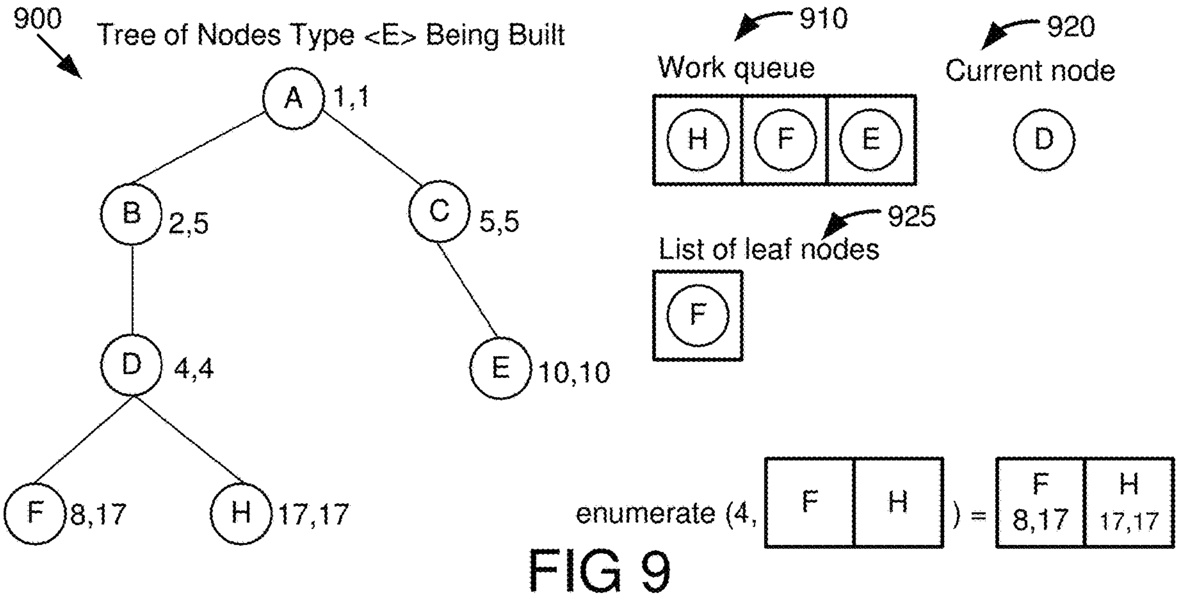
FIG. 9 is a block diagram that illustrates processing on node F, according to some embodiments described herein.

FIG. 9 is a block diagram 900 that illustrates example processing on node F. Once the current node D 920 has been processed, the form factor module 204 processes node E and node F in the work queue 910, and then from node F to node H in the work queue 910. The list of leaf nodes 925 includes node F because the form factor module 204 reached the leaf node F in the tree. The form factor module 204 applies the enumerate routine to compute pairs using parent node number 4 for node D. The enumerate routine for node F computes universal number 8 and semantic number 17. The enumerate routine for node H computes universal number 17 and semantic number 17.

Figure 10:
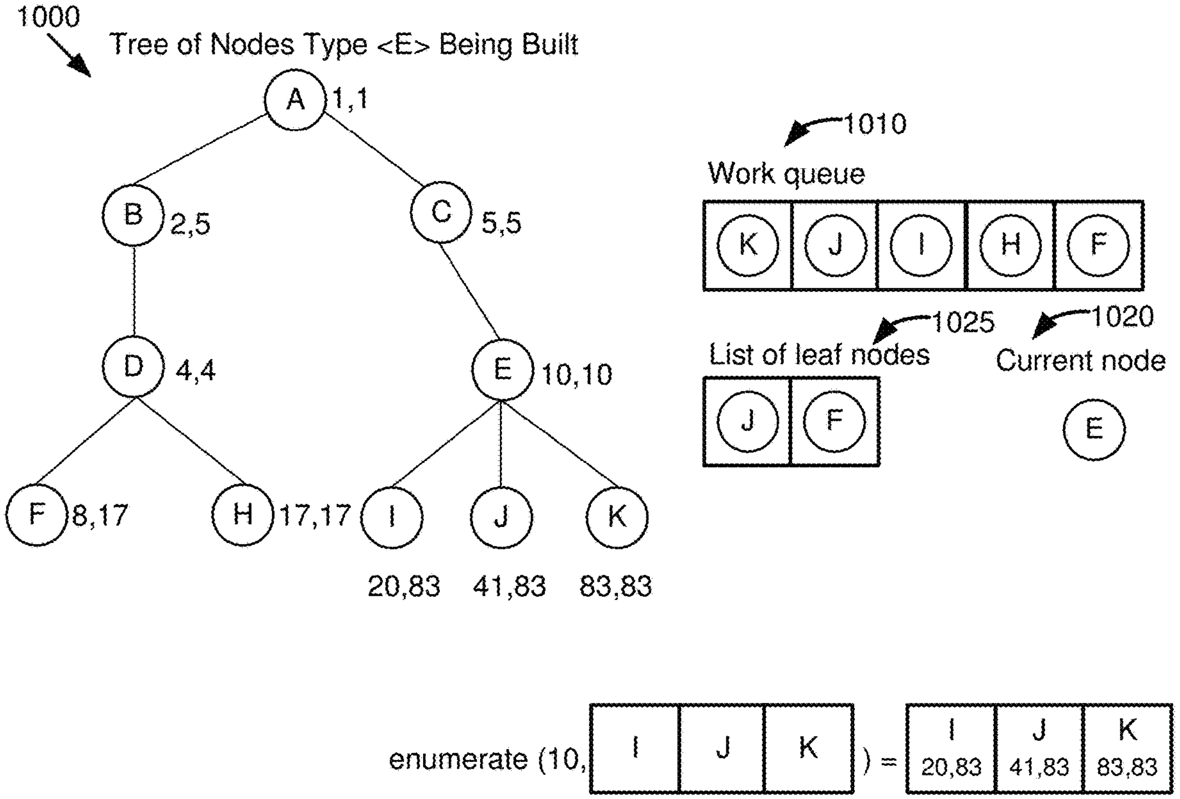
FIG. 10 is a block diagram that illustrates adding nodes I, J, and K to the output tree according to some embodiments described herein.

FIG. 10 is a block diagram 1000 that illustrates example addition of nodes I, J, and K to the output tree. Once the current node E 1020 has been processed, the form factor module 204 processes node F, node H, node I, node J, and node K in the work queue 1010. The list of leaf nodes 1025 includes node F and node J. Node F remains in the list of leaf nodes 1025 because a leaf node has no children and there will be no changes to the tree. The form factor module 204 applies the enumerate routine to compute pairs using parent node number 10 for node E. The enumerate routine for node I computes universal number 20 and the semantic number 83. The enumerate routine for node J computes universal number 41 and the semantic number 83. The enumerate routine for node K computes universal number 83 and the semantic number 83.

Figure 11:
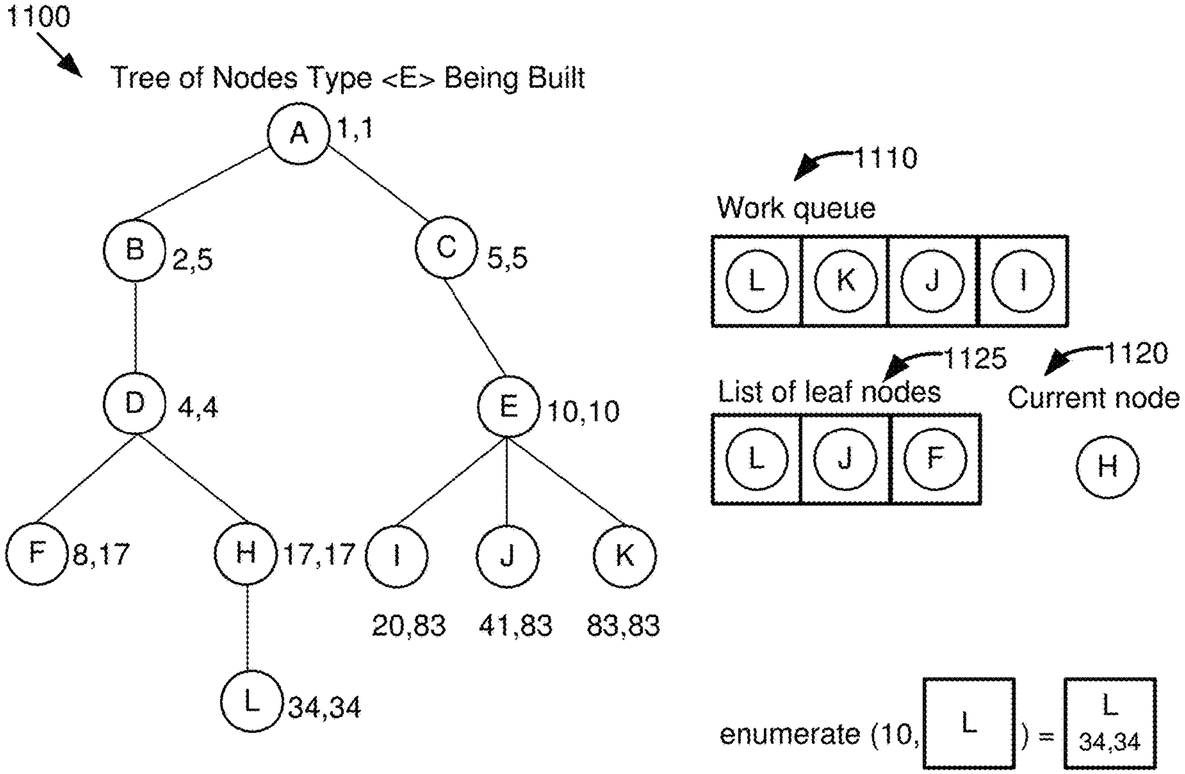
FIG. 11 is a block diagram that illustrates adding node L to the output tree, according to some embodiments described herein.

FIG. 11 is a block diagram 1100 that illustrates example addition of node L to the output tree. Once the current node H 1120 has been processed, the form factor module 204 processes node I, node J, node K, and node L in the work queue 1010. The list of leaf nodes 1125 includes node F, node J, and node L. The form factor module 204 applies the enumerate routine to compute pairs using parent node number 10 for node L. The enumerate routine for node L computes universal number 34 and the semantic number 34.

Figure 12:
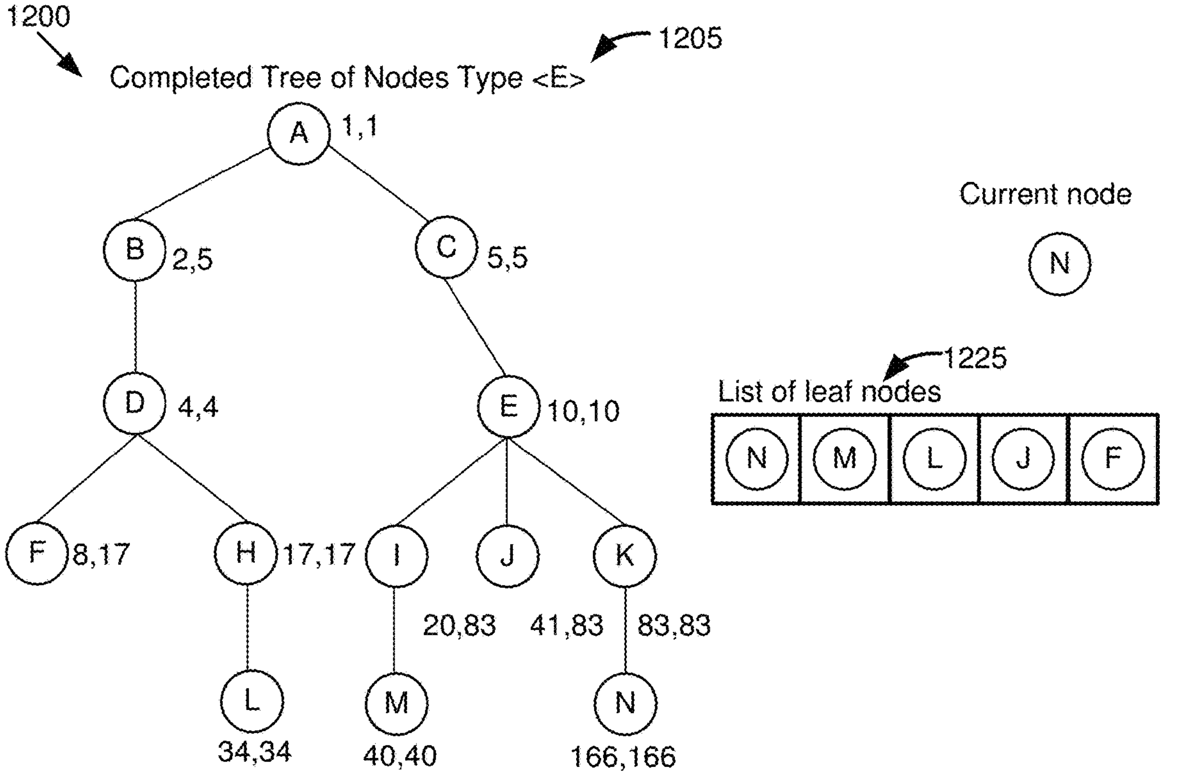
FIG. 12 is a block diagram that illustrates a completed tree and list of leaf nodes at an end of the first pass, according to some embodiments described herein.

FIG. 12 is a block diagram 1200 that illustrates an example completed tree and list of leaf nodes at an end of the first pass. After the form factor module 204 processes the work queue and the work queue is empty, the end of the first pass includes a completed tree of nodes type E 1205 and a sorted list of leaf nodes 1225. In this example, the list of leaf nodes 1225 is node F, node J, node L, node M, and node N. The list of leaf nodes 1225 is a starting point for the second top-down pass.

In some embodiments, the first top-down pass may be described by the following pseudo code:

```
PROCEDURE ENUMERATE
INPUT: ARRAY OF NODES <T> A, PARENT NODE NUMBER K
OUTPUT: ARRAY OF NODES <E> B
BEGIN
  B := NEW ARRAY<E>( )
  /* If parent node number K equals 0 we create root node <E> for
     the new tree */
  IF K = 0 THEN
    ROOT := NEW NODE<E>(A[0])
    ROOT.NUMBER := 1
    ROOT.SEMANTIC := 1
    B.ADD(ROOT)
    RETURN B
  END IF
```

-continued

```
/* Compute the semantic number for the set of children */
A_SIZE := A.SIZE
SEM_NUMBER := 2**(A_SIZE - 1)*(2*K + 1) - 1
/* For each node from the input array A create new node of type <E>,
assign
    number and semantic number to it and add it to the output array */
FOR i IN 0 .. A.SIZE - 1 LOOP
  CURRENT := A[i]
  NEW := NEW NODE<E>(CURRENT)
  NEW.NUMBER := (2**i)*(2*K + 1) - 1
  NEW.SEMANTIC := SEM_NUMBER
  B.ADD(NEW)
END LOOP
RETURN B
END
Procedure ENUMERATE will be called from the main algorithm.
/* Algorithm of building a 'Mirror' output tree <E> using
 * input tree <T> as a "template".
 * Leaf list and both work queues are class-level variables */
LEAF_LIST := NEW ARRAY<E>( )
PROCEDURE FIRST PASS
  INPUT
    ROOT_NODE_T<T> INPUT_TREE_NODE
  OUTPUT
    OUTPUT_NODE_E<E> EET_NODE
  DECLARE
    /* Work queue for the input tree */
    WRK_QUEUE_T LINKED_LIST<T> := NEW LINKED_
    LIST<T>( )
    /* 'Mirror' work queue for the output tree */
    WRK_QUEUE_E LINKED_LIST<E> := NEW LINKED_
    LIST<E>( )
  BEGIN
    /* Initialize structures for walk */
    ROOT_NODE_E := NEW EET_NODE(ROOT_NODE)
    ROOT_NODE_E.NUMBER := 1
    ROOT_NODE_E.SEM_NUMBER := 1
    WRK_QUEUE_T.ADD_FIRST(ROOT_NODE_T)
    WRK_QUEUE_E.ADD_FIRST(ROOT_NODE_E)
    WHILE WRK_QUEUE_T.SIZE > 0 LOOP
      CURRENT_T := WRK_QUEUE_T.POLL_LAST( )
      CURRENT_E := WRK_QUEUE_E.POLL_LAST( )
      CHILDREN_T ARRAY_LIST<T> :=
      CURRENT_T.GET_NODE_CHILDREN( )
      CHILDREN_E ARRAY_LIST<E> :=
      ENUMERATE(CHILDREN_T,
            CURRENT_T.GET_NODE_NUMBER)
      /* Add both collections of children to the head of respective
         work queue */
      FOR ( T CHILD_T: CHILDREN_T ) LOOP
        WRK_QUEUE_T.ADD_FIRST(CHILD_T)
      END LOOP
      FOR ( E CHILD_E: CHILDREN_E ) LOOP
        CHILD_E.SET_NODE_PARENT(CURRENT_E)
        CURRENT_E.ADD_CHILD(CHILD_E)
        WRK_QUEUE_E.ADD_FIRST(CHILD_E)
        IF CHILD_E.IS_LEAF THEN
          LEAF_LIST.ADD(CHILD_E)
        END IF
      END LOOP
    END LOOP
    RETURN OUTPUT_NODE_E
  END
END PROCEDURE FIRST_PASS
```

The form factor module 204 implements a second top-down pass that uses the universal numbers of the leaf nodes to compute the form factors of all the nodes in the output tree. During the first top-down pass, the form factor module 204 presents a path from the root node to the current node, which is then used to compute the form factors for all the internal nodes and leaf nodes in the output tree.

The form factor of a leaf node is always (0, 1) where the first number represents the depth and the second number represents the width. As a result, the form factor module 204 assigns the form factors to all the leaf nodes while they are being added to the list of leaf nodes during the second pass.

The completed tree may be represented as a set of paths from the root node to every leaf node in the completed tree. By virtue of a tree structure, each path, when tracked from its leaf node to the root node eventually converges with other paths, and ultimately, all paths converge at the root node. As a result, the total number of paths from the root node to all leaf nodes is equal to the width of the completed tree.

Figure 13:
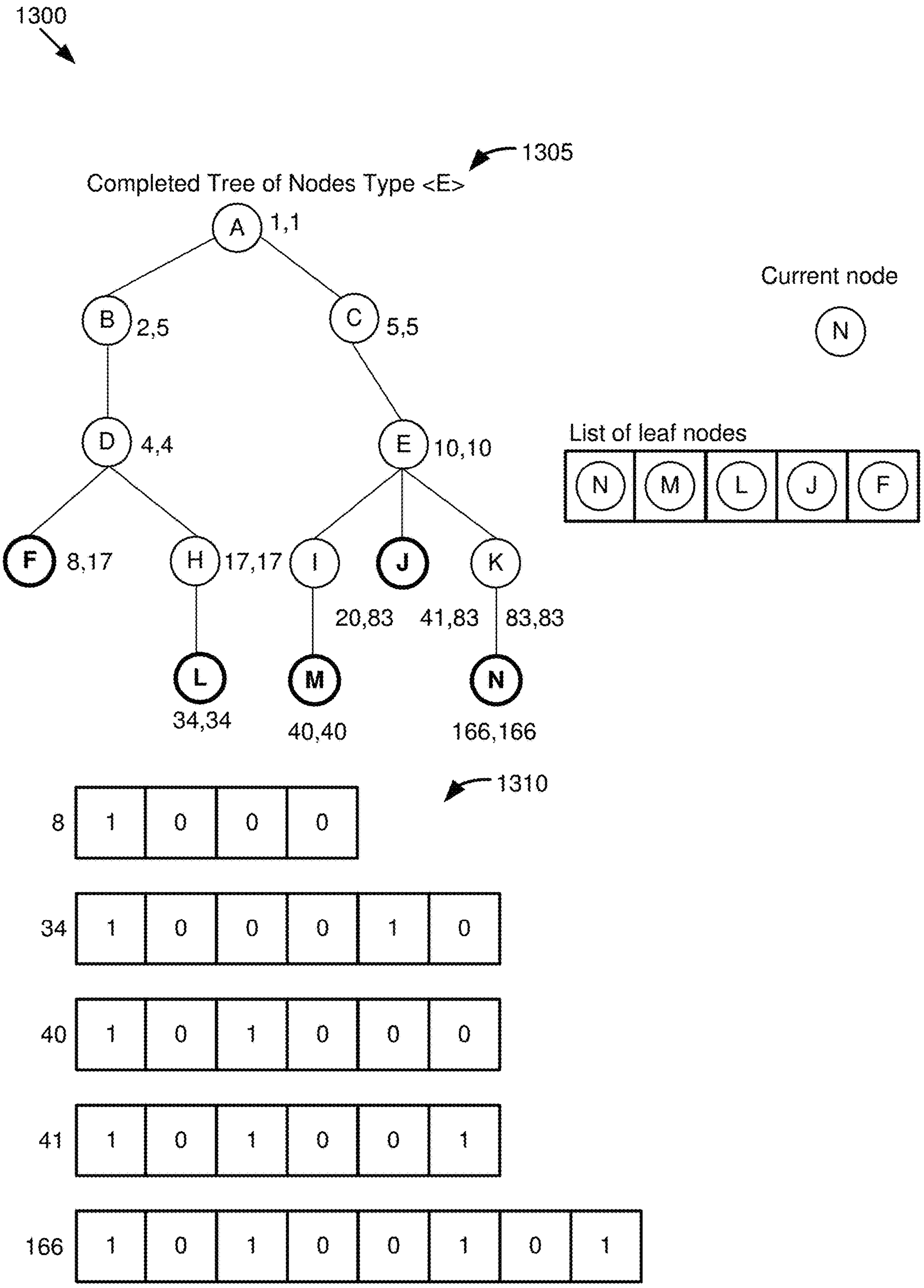
FIG. 13 is a block diagram that illustrates an output tree and a bitmap matrix at a beginning of a second pass, according to some embodiments described herein.

FIG. 13 is a block diagram 1300 that illustrates an example completed tree 1305 and bitmap matrix before the form factor module 204 begins the second pass. The leaf nodes F, L, M, J, and N in the completed tree 1305 are bolded for ease of identification. A depth of the completed tree 1305 is equal to a level of a most-bottom node. In this example, the depth is node 166 at level 4 (and not 5 because the root node starts at 0). The width of the completed tree 1305 at the root node equals 5 because the width is the greatest width in the tree, which is five with the inclusion of nodes F, H, I, J, and K.

The bitmap matrix 1310 represents a binary representation of the universal number for each of the leaf nodes. For example, leaf node F has the universal number 8, which is represented in binary as 1000. This also represents the path from root node A to leaf node F, which is A to B to D to F.

Leaf node L has the universal number 34, which is represented in binary as 100010. The path from root node A to leaf node L is A to B to D to F to H to L. As mentioned above, the root node always has the universal number 1. Then each move down a path between nodes is 0, except when the traversal is to the right from one branch to another. As a result, the move from node F to node H is represented as 1 in the path. The last 0 is the transition from node H to node L. The width of the left subtree with node L is 2.

Leaf node M has the universal number 40, which is represented in binary as 101000. Leaf node J has the universal number 41, which is represented in binary as 101001. Lead node N has the universal number 166, which is represented in binary as 10100101.

Figure 14:
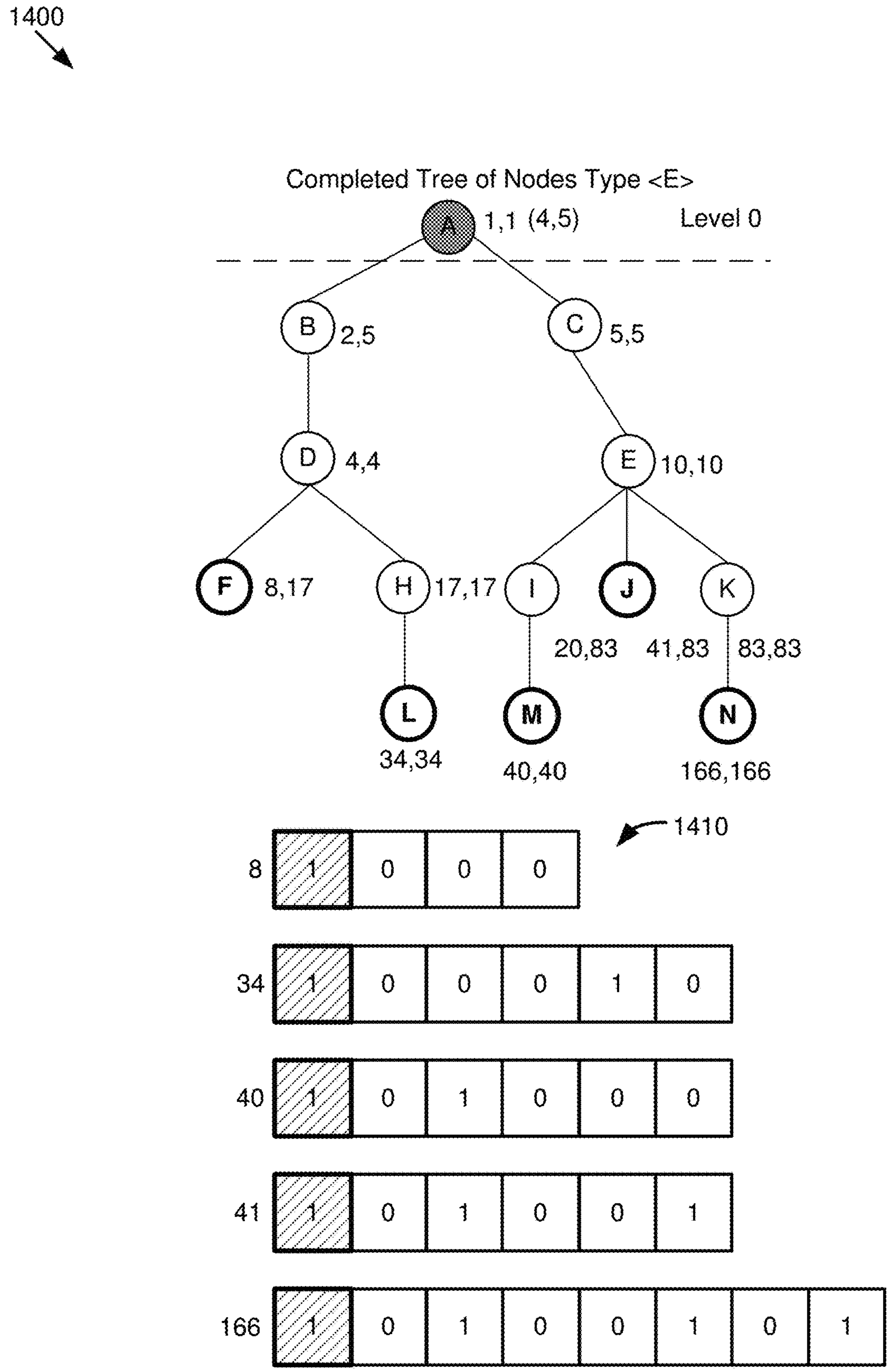
FIG. 14 is a block diagram that illustrates a form factor of the root node after a first step of the second pass, according to some embodiments described herein.

FIG. 14 is a block diagram 1400 that illustrates an example form factor of the root node after a first step of the second pass at level 0. The form factor module 204 starts at the root node where all paths in the tree start with 1 when written in binary representations. This corresponds to the bolded and gray-lined first blocks that include 1.

As mentioned above, the bitmap matrix 1410 includes a binary representation of the universal number for each of the leaf nodes. The universal number contains a path from the root node to the leaf node. The universal node for the root node is always 1, which means that each path always starts with 1. The root node represented as 1 in the binary matrix is bolded and the block is lined for ease of identification.

There are two types of transitions that occur while walking the tree: down and to the right. The form factor module 204 computes the form factors of level 1 by shifting to the right in all binary strings until the following two conditions are true in each string. First, the number of zero symbols to the left of the pointer is increased by one (this is equivalent to descending one level down). Second, there is a zero immediately to the right of the pointer. The second condition means that the form factor module 204 keeps shifting to the right as long as there is a one immediately to the right of the marker. The depth corresponds to the maximum number of zeros in a string, which in this case is 4.

The total number of rows in the bitmap matrix 1410 is five, which means there are five paths from the root to the leaf node. The number of paths is the same as the width of the tree. The maximum width of the tree is equal to the width. As a result, the form factor for node A is (4, 5).

Figure 15:
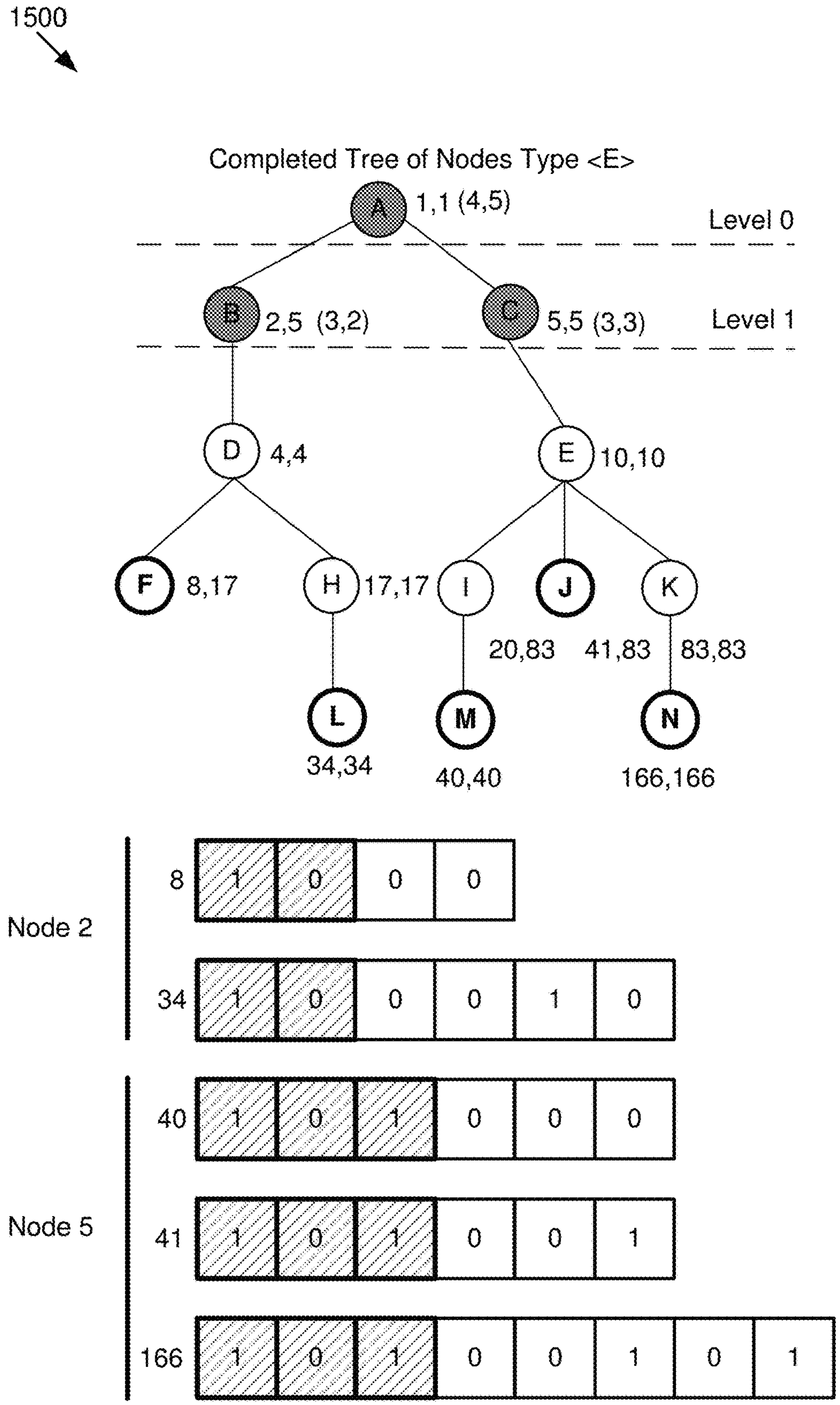
FIG. 15 is a block diagram that illustrates form factors for level 1 nodes, according to some embodiments described herein.

FIG. 15 is a block diagram 1500 that illustrates example form factors for level 1 when both conditions are true. The form factor module 204 groups binary strings by values of their prefixes (the bolded numbers in FIG. 15), to obtain two groups of strings corresponding to first level nodes 2 and 5, respectively.

Node 2 represents the two binary strings for node B. The binary for the first two blocks of strings in node 2 are 2 in decimal, which corresponds to the universal number for node B, which also corresponds to the two paths off of node B and the width being 2. The form factor module 204 determines the maximum number of zeros to the right of the pointer is equal to 3. Therefore, the form factor module 204 determines that the form factor for node B equals (3, 2).

Node 5 represents the three strings for node C. The binary for the first three blocks of strings in node 5 are 5 in decimal, which corresponds to the universal number 5 for node C. The form factor module 204 determines the maximum number of zeros to the right of the pointer is 3 and the maximum width of the subtree is 3 because nodes I, J, and K are three-nodes wide. Therefore, the form factor module 204 determines that the form factor for node C equals (3, 3).

Figure 16:
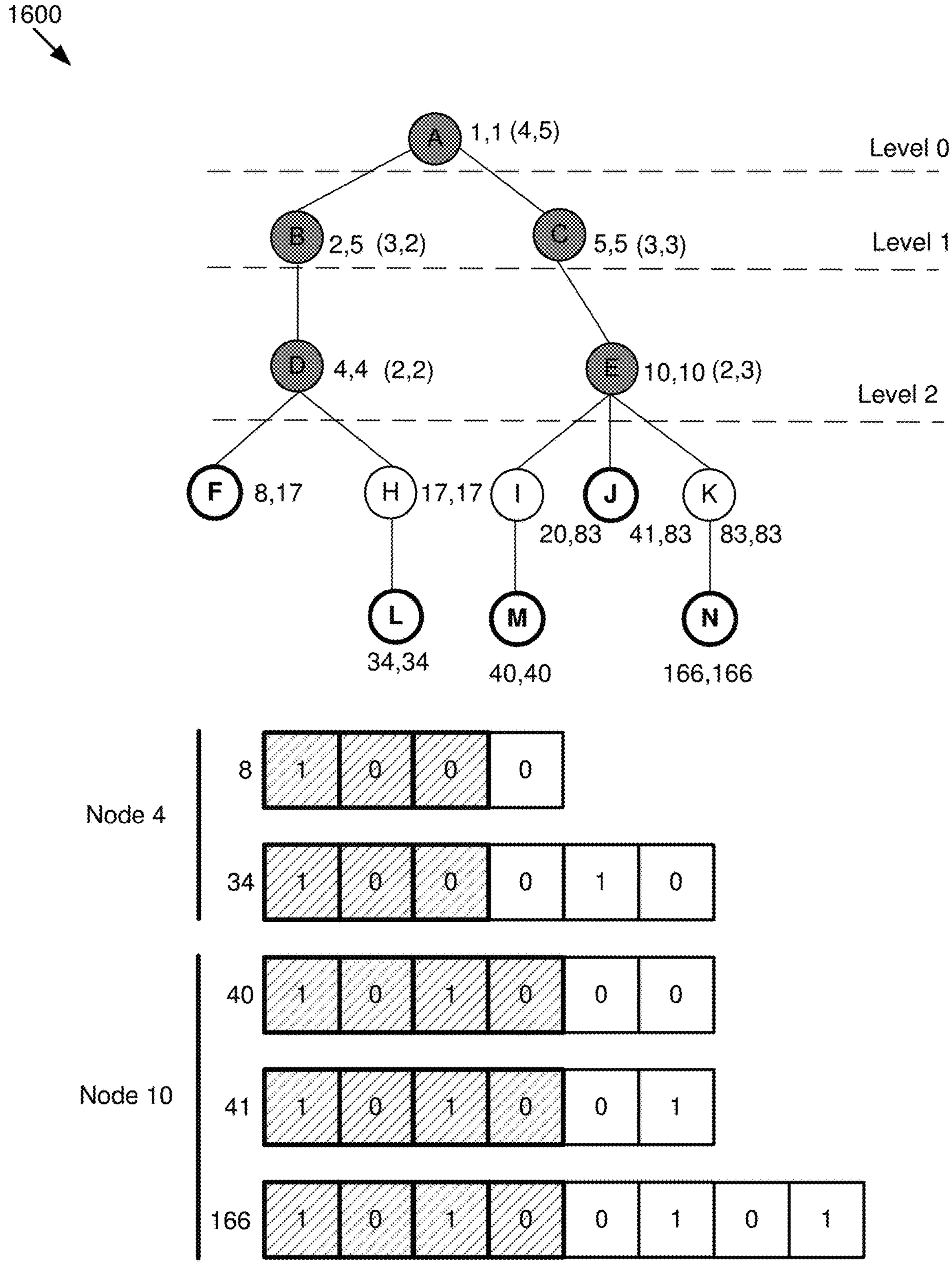
FIG. 16 is a block diagram that illustrates form factors for level 2 nodes, according to some embodiments described herein.

FIG. 16 is a block diagram 1600 that illustrates example form factors for level 2 nodes. In this example, node D has the universal number 4 is a subtree with two strings and node E is a subtree with three strings.

Node 4 represents the two subtrees for node D. The binary for the first three blocks of strings in node 4 is 4 in decimal, which corresponds to the universal number for node D. The form factor module 204 determines the maximum number of zeros to the right of the pointer is equal to 2 and the depth is therefore 2. The form factor determines that the width of the subtree is 2. As a result, the form factor module 204 determines that the form factor for node D equals (2, 2).

Node 10 represents the three subtrees for node E. The binary for the first four blocks of strings in node 10 is 10 in decimal, which corresponds to the universal number for node E. The form factor module 204 determines the maximum number of zeros to the right of the pointer is equal to 2 and the depth is therefore 2. The form factor determines that the width of the subtree is 3. As a result, the form factor module 204 determines that the form factor for node E equals (2, 3).

Figure 17:
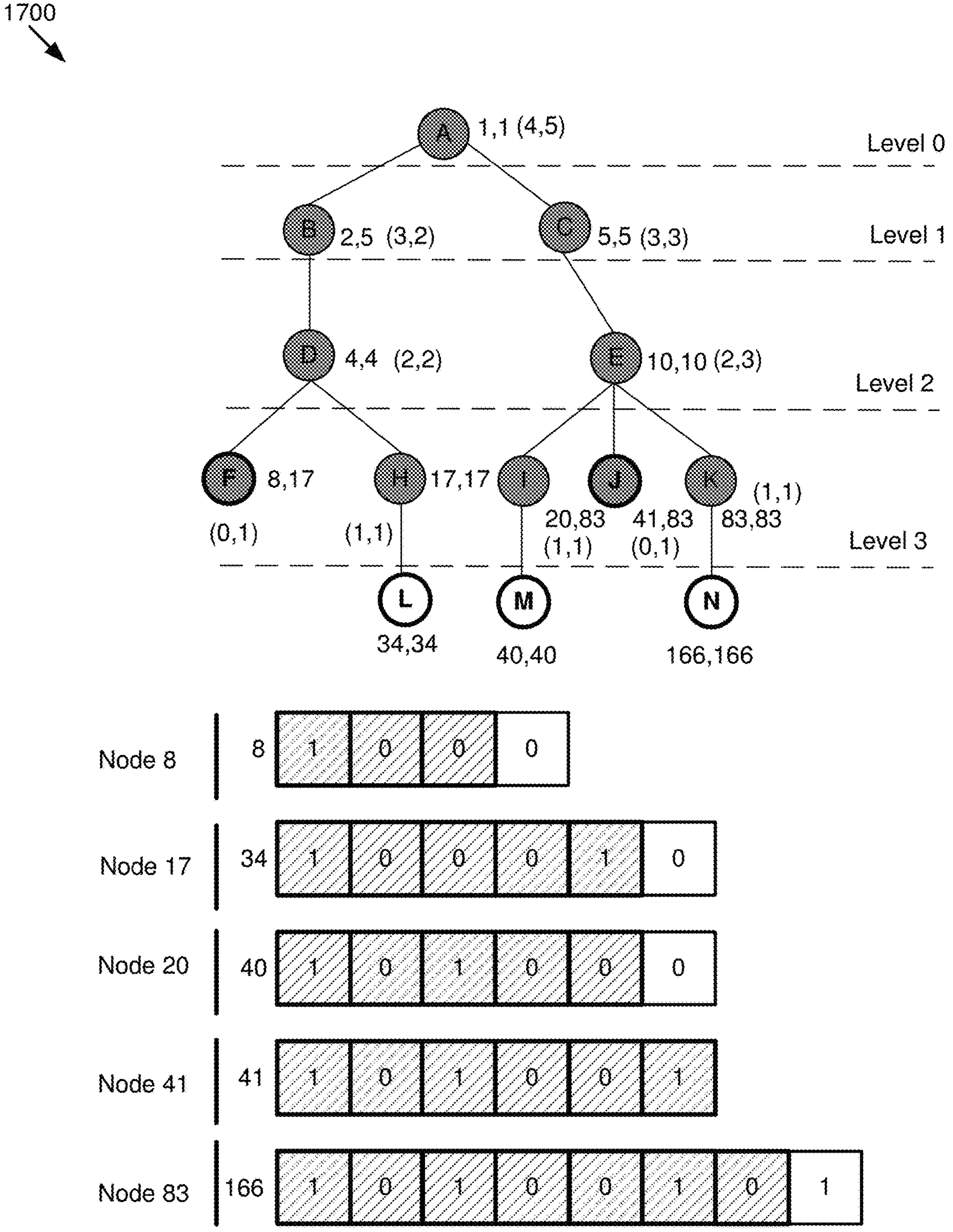
FIG. 17 is a block diagram that illustrates form factors for level 3 nodes, according to some embodiments described herein.

FIG. 17 is a block diagram 1700 that illustrates example form factors for level 3 nodes. There are five nodes that each have a string, where the strings correspond to node F, node H, node I, node J, and node K, respectively. For node F and node J, the binary strings are spent completely and the form factor module 204 discards the strings for further processing. Because node F and node J are leaf nodes, the form factors are automatically (0, 1). The form factor module 204 determines that the form factor for node H equals (1, 1), the form factor for node I equals (1, 1), and the form factor for node K equals (1, 1).

Figure 18:
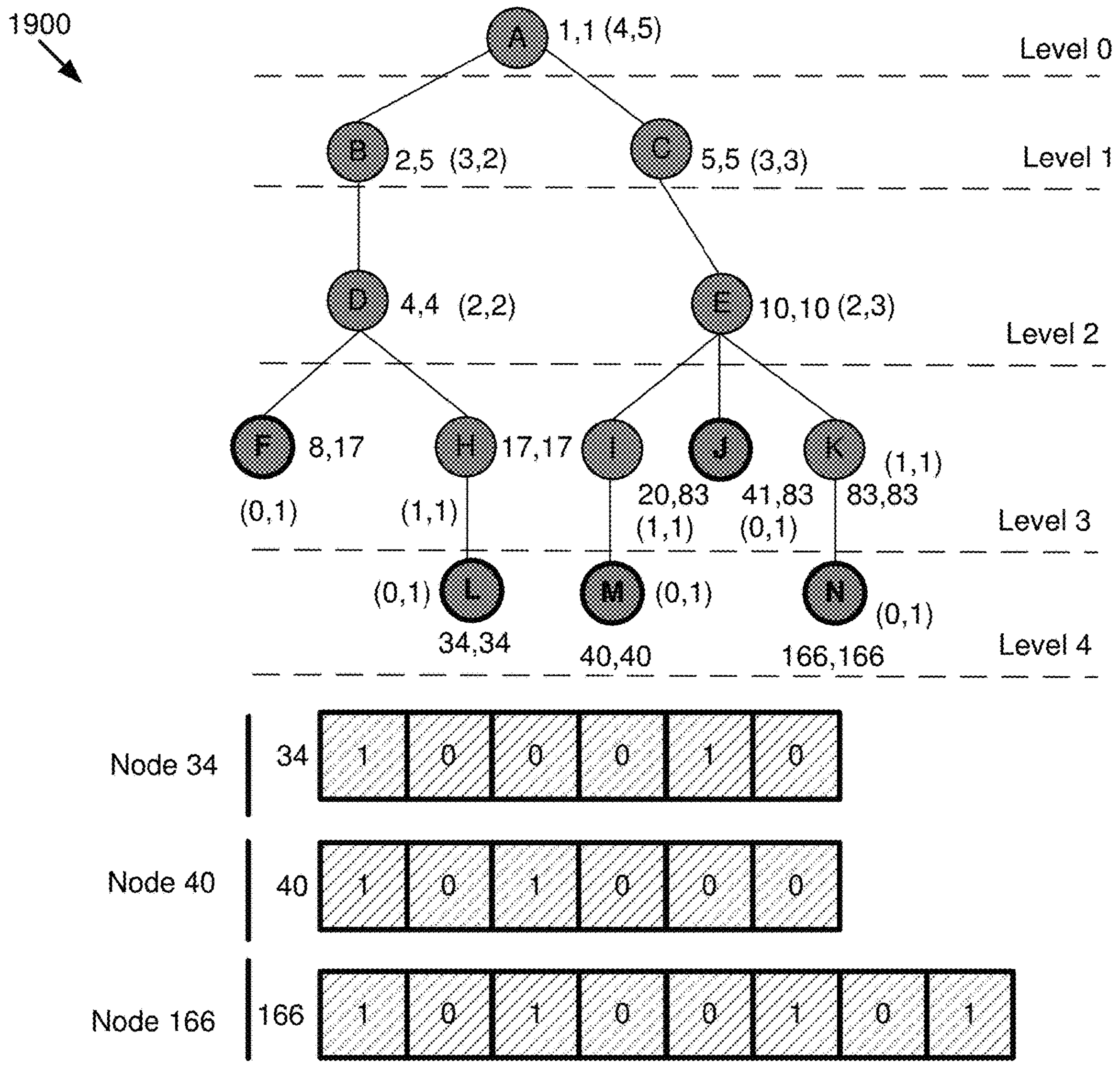
FIG. 18 is a block diagram illustrates the form factors for level 4 nodes and an output tree at the end of the second pass, according to some embodiments described herein.

FIG. 18 is a block diagram 1800 that illustrates example form factors for level 4 nodes and an output tree at the end of the second pass. In this example, there are three groups of strings for node L, node M, and node N, respectively. Because all three nodes are leaf nodes, the form factors are automatically (0, 1).

The form factor module 204 generates an output tree of nodes <E> with all the intended data.

Figure 19:
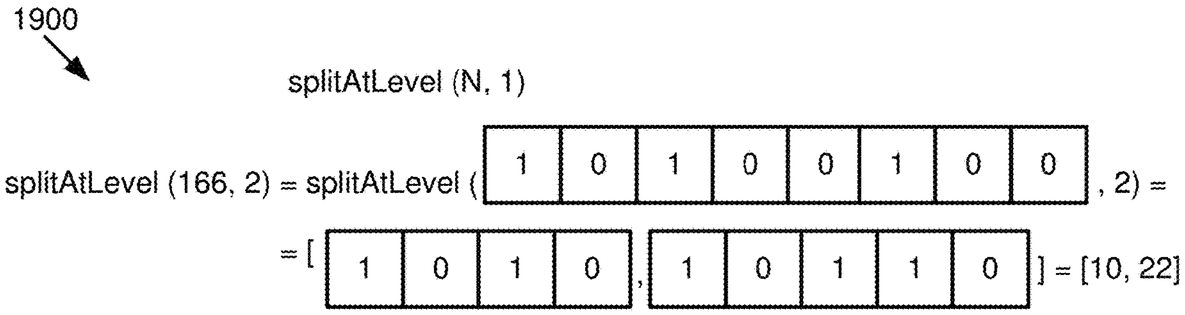
FIG. 19 is a block diagram that illustrates the results of a split at level function call, according to some embodiments described herein.

In some embodiments, the form factor module 204 uses an auxiliary method called splitAtLevel(N, l) that takes a node number N and level l and returns two numbers. FIG. 19 is a block diagram 1900 that illustrates example results of a split at level method. The splitAtLevel method converts an input number into a binary string, splits the binary string into two strings cutting right past the $l^{th}$ symbol 0 (where I is the second input parameter of the method). The method converts the two strings back into unsigned decimal numbers and provides the result to the caller. The numbers represent an ancestor's node number for the input node N at level l and the number of node N unshifted by the ancestor node number.

The numbers are used for grouping by node and subtree width computation. If level l passed to the function is equal to the actual level of node N, the function returns pair [N, 0] to indicate that the string has just been spent. If level l passed to the function exceeds the actual level of node N, the function returns NULL indicating that the binary string has been completely processed.

In some embodiments, the form factor module 204 stores the output tree as a separate table. In some embodiments, the form factor module 204 stores the universal number, the semantic number, and the form factor for each node as part of the tree metadata.

In some embodiments, the second top-down pass may be described by the following pseudo code:

```
/* Auxiliary function to find maximum level in an array of node numbers
of
    type <N>, uses function NODE_LEVEL from BITS library */
FUNCTION MAX NODE LEVEL
INPUT: ARRAY<N>[ ] NODE_NUMBERS
OUTPUT: int MAX_LEVEL
BEGIN
  int MAX_LEVEL := 0
  FOR i IN 0 .. NODE_NUMBERS.SIZE - 1 LOOP
    IF NODE_LEVEL(NODE_NUMBERS[i]) > MAX_LEVEL THEN
      MAX_LEVEL := NODE_LEVEL(NODE_NUMBERS[i])
    END IF
  END LOOP
  RETURN MAX_LEVEL
END
PROCEDURE COMPUTE FORM FACTORS
/* Input: a root node of tree of nodes type <E>, an array of leaf nodes
of
    type <E> obtained at previous pass,node number data type is <N>
(could be
    Integer, BigInteger, or int
    Function GET_NODE(NODE_NUMBER) will be used to locate
node with number
    NODE_NUMBER in an input tree;
    it is assumed to be a part of TREE library */
INPUT: NODE<E> ROOT, NODE<E>[ ] LEAF_NODES
BEGIN
  ARRAY<N>[ ] WRKARY := NEW ARRAY<>( )
  /* Populate work array with leaf node numbers taken from
LEAF_NODES */
  FOR i IN 0 .. LEAF_NODES.SIZE - 1 LOOP
    WRKARY.ADD_FIRST(LEAF_NIODES[i].NODE_NUMBER)
  END LOOP
  /* Compute form_factor for root node */
  int DEPTH = MAX_NODE_LEVEL (WRKARY)
  int WIDTH = WRKARY.SIZE
  int FORM_FACTOR[2] := [DEPTH, WIDTH]
  ROOT.FORM_FACTOR := FORM_FACTOR
  /* Keep descending tree levels until all levels are walked */
  int LEVEL := 1
  WHILE WRKARY.SIZE > 0 LOOP
    /* Hash of arrays to store intermediate results for computations */
    HASH<N, ARRAY<N>[ ]> WORKHASH := NEW HASH<>( )
    FOR i IN 0 .. WRKARY.SIZE - 1 LOOP
      ARRAY<N>[2] SPLIT := splitAtLevel(WRKARY[i], LEVEL)
      /* If current string has already been spent skip to the next one
*/
      IF SPLIT = NULL THEN
        CONTINUE
      END IF
      /* Initialize array for current node in work hash if necessary */
      IF NOT EXISTS(WORKHASH[SPLIT[0]) THEN
        WORKHASH[SPLIT[0]] := NEW ARRAY<N>( )
      END IF
      WORKHASH[SPLIT[0].ADD(SPLIT[1])
    END LOOP
```

-continued

```
    /* Intermediate results for level LEVEL are computed and populated.
       Now go ahead and compute form-factors */
    FOREACH KEY: WORKHASH.KEYSET( ) LOOP
      IF KEY = WORKARY[i] THEN
        <N> CUR_NODE := GET_NODE(ROOT, KEY)
        CUR_NODE.FORM_FACTOR := [0, 1]
      ELSE
        int DEPTH := MAX_NODE_LEVEL(WORKHASH[KEY])
        int WIDTH := WORKHASH[KEY].SIZE
        <N> CUR_NODE := GET_NODE(ROOT, KEY)
        CUR_NODE.FORM_FACTOR := [DEPTH, WIDTH]
      END IF
    END LOOP
  END LOOP
END
```

The search engine 206 performs a search of a tree in response to a query. In some embodiments, the search engine 206 includes a set of instructions executable by the processor 235 to perform a search. In some embodiments, the search engine 206 is stored in the memory 237 of the computing device 200 and can be accessible and executable by the processor 235.

In some embodiments, the search engine 206 receives a search query from a user. For example, the search engine 206 may receive a search query with a candidate tree from a user 125 of a client device 110, such as the one illustrated in FIG. 1.

In some embodiments, before the search engine 206 performs filtering of a database of trees by identifying a root node for the candidate tree and a corresponding form factor. For example, the search query may include a request for any nodes that have a form factor of (6, 7). The search engine 206 identifies a subset of trees with one or more nodes that have a form factor of (6, 7).

The search queries may include requests to search tree structures of very large sizes (e.g., hundreds of thousands to tens of millions of nodes) used by a variety of different applications, such as AI applications, JIT compilation systems, automated code optimization systems, static code analyzers, semantic patterns processors, advanced search engines, CAD software, CRM platforms, BIL applications, ERP applications, social networking platforms, etc. By narrowing down the tree structures to ones with nodes that have a matching form factor, the options for searching may be reduced from tens of millions of nodes to thousands of nodes, which the search engine 206 searches to identify subtrees that match the candidate tree.

For example, the search query may be a request to search a tree that is a parse tree of an input SQL statement, where the form factor module 204 converted the parse tree into an enhanced enumerated tree with form factors stored at each node. In some embodiments, the form factor module 204 serialized the enhanced enumerated tree into relational tables.

Continuing with the example above, the search engine 206 may receive a search query that includes a selection of a SQL text fragment that represents a potential performance anti-pattern that was converted into an enhanced enumerated sample subtree with sample subtrees stores in a separate table by the form factor module 204. The search engine 206 uses the sample subtree to find similar patterns in hundreds of thousands of production SQL statements using different affinity metrics. In some embodiments, the search engine 206 performs search and comparison operations on serialized flat data stored in relational tables where no reconstruction of the original trees is needed.

For example, the search engine 206 receives a SQL query used in a business intelligence report. The SQL query is large and complex and contains 8 EXISTS conditions where one of the conditions causes a database server to crash. The EXISTS conditions are standard means of access rights management and security, which suggests that the same EXISTS condition keeps crashing the sample report. As a result of having an output tree with form factors calculated for each node in the tree, the search engine 206 is able to search for the SQL code that causes the database server to crash before the code is provided to a client and causes the client's website to crash.

The search engine 206 uses the following SQL statement to quickly and efficiently locate all EXISTS conditions in the sample SQL code:

```
SELECT * FROM CPSR_ENHANCED_TREES
WHERE HASHID = 'ad78d7288ff2b4bfc9a41a6f95051dd5'
AND CONTENT = 'condition exists_condition';
```

Turning to FIG. 20, a block diagram 2000 illustrates an example search query received by the search engine 206. In this example, the sample business intelligence query contains eight distinct EXISTS conditions. The administrator is interested in the circled 2005 EXISTS condition with form factor (22, 182). To avoid wasting resources and time checking every EXISTS predicate in a target query, the search engine 206 filters candidate subtrees that are much more likely to match the sample subtree because one or more nodes in the candidate subtrees include form factor (22, 182). In some embodiments, the following SQL pseudo code may be used to filter candidate nodes in the SQL query identified by a given HASHID 'XXXXXXX':

```
SELECT * FROM CPSR_ENHANCED_TREES WHERE HASHID =
'XXXXXXX'
AND DEPTH = 22 AND WIDTH = 182
AND CONTENT = 'condition exists_condition';
```

Once the search engine 206 identifies the candidate node, the search engine 206 may implement a query, such as a SQL query, to match the subtree rooted in the candidate node, with the sample subtree. If the search engine 206 returns an empty set, this indicates a complete structural match of the subtrees.

In some embodiments, the search engine 206 further refines the search query using additional parameters, such as checking for the types of nodes, computing distances between sets representing candidate subtrees and sample subtrees, etc.

The user interface module 208 generates a user interface. In some embodiments, the user interface module 208 includes a set of instructions executable by the processor 235 to generate the user interface. In some embodiments, the user interface module 212 is stored in the memory 237 of the computing device 200 and can be accessible and executable by the processor 235.

Figure 21:
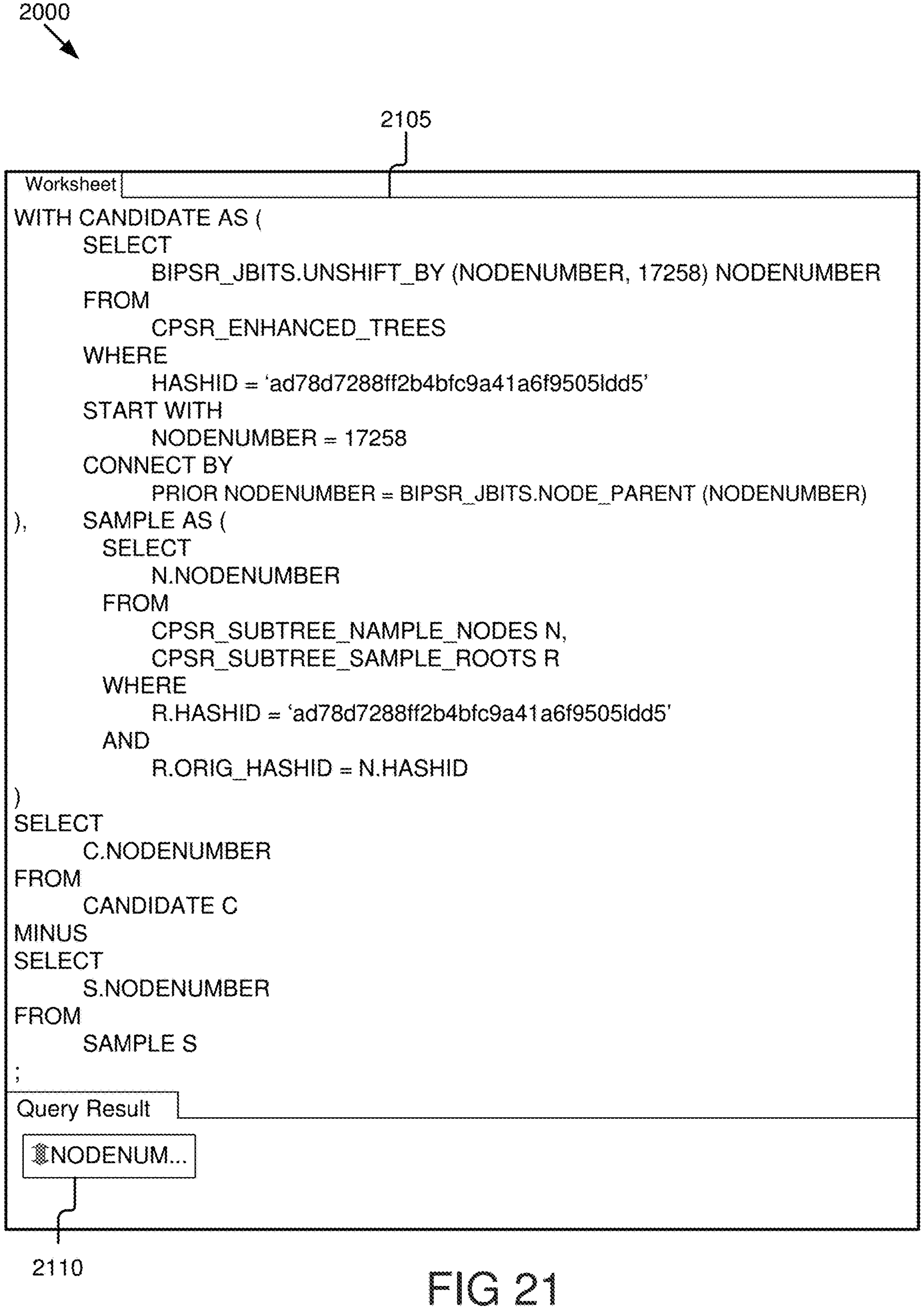
FIG. 21 is a block diagram that illustrates example search results generated by a search engine, according to some embodiments described herein.

In some embodiments, the user interface module 208 generates a user interface for a user to provide a search query for the search engine 206 and that updates with the results of the search query. Turning to FIG. 21, a block diagram 2100 of an example user interface of an example SQL pseudocode query 2105 and example search results generated by the user interface module 208 is illustrated. The user interface module 208 receives the search results from the search engine 206 and generates graphical data for displaying the search results. In this example, the search engine 206 returns a matching subtree in the nodenumber box 2110 that matches the query provided to the search engine 206.

Example Methods

Figure 22:
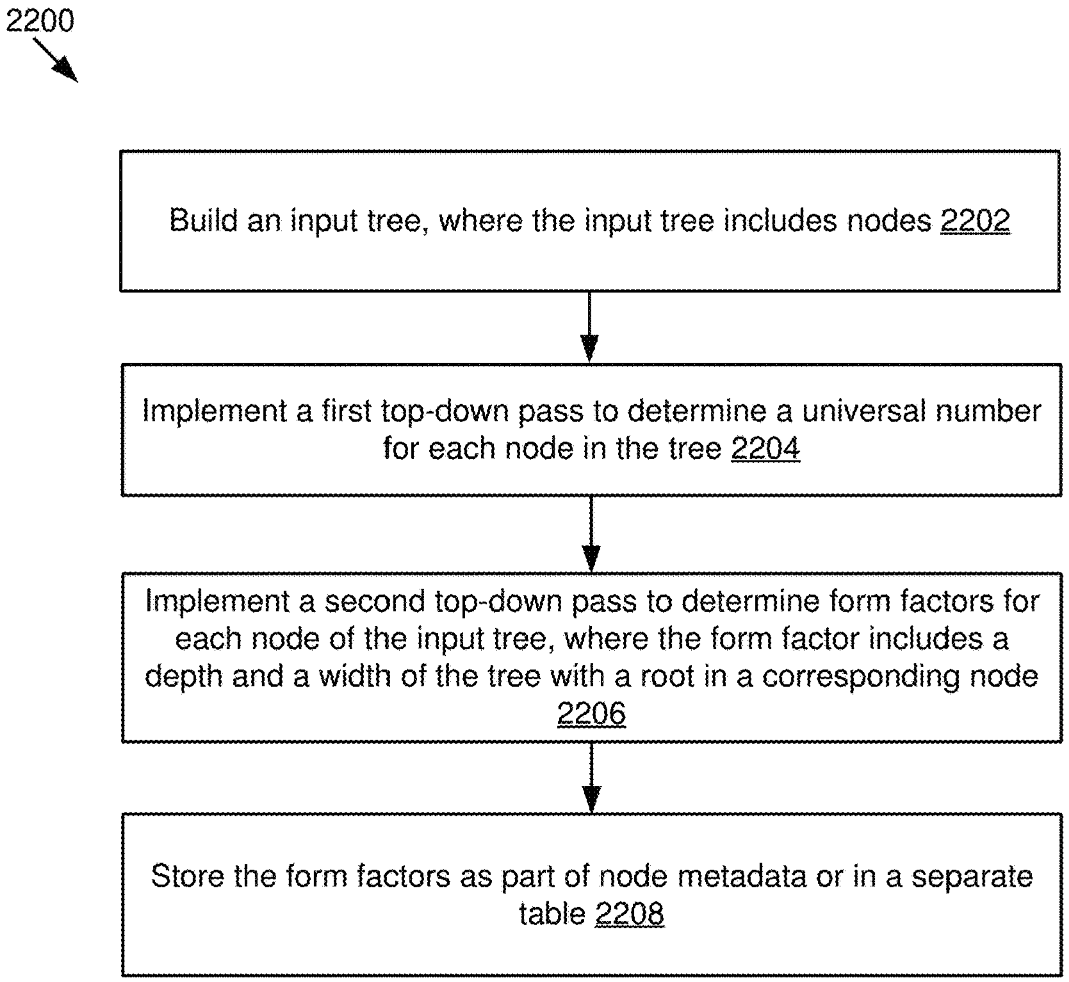
FIG. 22 is a flow diagram of an example method to determine form factors of a tree, according to some embodiments described herein.

FIG. 22 is a flow diagram of an example method 2200 to determine form factors of a tree. In some embodiments, the method 2200 is performed by the enterprise server system 101 in FIG. 1. In some embodiments, the method 2200 is performed by the client device 110 in FIG. 1. In some embodiments, the method 2200 is performed in part by the enterprise server system 101 and in part by a client device 110 in FIG. 1. The method 2200 may begin with block 2202.

At block 2202, an input tree is built, where the input tree includes nodes. Block 2202 may be followed by block 2204.

At block 2204, a first top-down pass is implemented to determine a universal number for each node in the tree. Block 2204 is followed by block 2206.

At block 2206, a second top-down pass is implemented to determine form factors for each node of the input tree, where the form factor includes a depth and a width of the tree with a root in a corresponding node. Block 2206 is followed by block 2208.

At block 2208, the form factors are stored as part of node metadata or in a separate table.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A computer-implemented method comprises:

receiving an input tree of a collection of trees, the input tree having a plurality of paths from a root node to respective leaf nodes;

determining form factors for individual nodes of the input tree, wherein the form factors include a depth determined by counting a number of edges in a longest path between a corresponding node to a last respective leaf node, rather than by counting the nodes, and a width with a root in a corresponding node, determined by counting a maximum number of nodes at a level from the corresponding node;

storing the form factors associated with the individual nodes;

receiving a search query with node information of a sample tree structure including at least one form factor of interest;

filtering the collection of trees by identifying a subset of trees having the at least one form factor of interest, associated with one or more matching nodes; and searching the subset of trees to identify the trees that match the sample tree structure.

2. The method of claim 1, wherein storing the form factors includes serializing the form factors into flat data stored in at least one table, and wherein the filtering and searching is performed on the flat data.

3. The method of claim 1, wherein searching for the subset of trees includes refining the search query using additional parameters including at least one of: checking for types of nodes, and computing distances between sets representing the subtrees and sample subtree structures.

4. The method of claim 1, wherein the sample tree structure represents code or pseudocode that presents a potential performance problem, and based on identifying the trees, the method further comprises identifying the potentially problematic code or pseudocode represented in the collection of trees, to address the potential performance problem.

5. The method of claim 1, further comprising:

generating a bitmap matrix of strings from each leaf node of the input tree, wherein determining the form factors is for corresponding nodes at each subsequent level of the input tree based on the bitmap matrix.

6. The method of claim 5, wherein a zero or a one digit in the bitmap matrix of strings indicates descending one level down a path and the depth corresponds to a number of the zeros or the ones to a right of a pointer in one or more corresponding strings in the bitmap matrix.

7. The method of claim 5, further comprising:

splitting a string at a level of the input tree into two strings to determine whether the string in the bitmap matrix is spent; and responsive to determining that the string in the bitmap matrix is spent, discarding the string.

8. A device comprising:

a processor; and a memory coupled to the processor, with instructions stored thereon that, when executed by the processor, cause the processor to perform operations comprising:

receiving an input tree of a collection of trees, the input tree having a plurality of paths from a root node to respective leaf nodes;

determining form factors for each node of the input tree, where each form factor includes a depth determined by counting a number of edges in a longest path between a corresponding node to a last respective leaf node, rather than by counting the nodes, and a width with a root in a corresponding node, determined by counting a maximum number of nodes at a level from the corresponding node;

storing the form factors;

receiving a search query with node information of a sample tree structure including at least one form factor of interest;

filtering the collection of trees by identifying a subset of trees having the at least one form factor of interest, associated with one or more matching nodes; and searching the subset of trees to identify the trees that match the sample tree structure.

9. The device of claim 8, wherein storing the form factors includes serializing the form factors into flat data stored in at least one table, and wherein the filtering and searching is performed on the flat data.

10. The device of claim 8, wherein searching for the subset of trees further includes refining the search query using additional parameters including at least one of: checking for types of nodes, and computing distances between sets representing the subtrees and sample subtree structures.

11. The device of claim 8, wherein the sample tree structure represents code or pseudocode that presents a potential performance problem, and based on identifying the trees, the method further comprises identifying the potentially problematic code or pseudocode represented in the collection of trees, to address the potential performance problem.

12. The device of claim 8, wherein the operations further comprise:

generating a bitmap matrix of strings from each leaf node of the input tree, wherein determining the form factors is for corresponding nodes at each subsequent level of the input tree based on the bitmap matrix.

13. The device of claim 12, wherein a zero or a one digit in the bitmap matrix of strings indicates descending one level down a path and the depth corresponds to a number of the zeros or the ones to a right of a pointer in one or more corresponding strings in the bitmap matrix.

14. A non-transitory computer-readable medium with instructions stored thereon that, when executed by one or more computers, cause the one or more computers to perform operations, the operations comprising:

receiving an input tree of a collection of trees, the input tree having a plurality of paths from a root node to respective leaf nodes;

determining form factors for each node of the input tree, where each form factor includes a depth determined by counting a number of edges in a longest path between a corresponding node to a last respective leaf node, rather than by counting the nodes, and a width with a root in a corresponding node, determined by counting a maximum number of nodes at a level from the corresponding node;

storing the form factors;

receiving a search query with node information of a sample tree structure including at least one form factor of interest;

filtering the collection of trees by identifying a subset of trees having the at least one form factor of interest, associated with one or more matching nodes; and searching the subset of trees to identify the trees that match the sample tree structure.

15. The non-transitory computer-readable medium of claim 14, wherein storing the form factors includes serializing the form factors into flat data stored in at least one table, and wherein the filtering and searching is performed on the flat data.

16. The non-transitory computer-readable medium of claim 14, wherein searching for the subset of trees includes refining the search query using additional parameters including at least one of: checking for types of nodes, and computing distances between sets representing the subtrees and sample subtree structures.

17. The non-transitory computer-readable medium of claim 14, wherein the sample tree structure represents code or pseudocode that presents a potential performance problem, and based on identifying the trees, the method further comprises identifying the potentially problematic code or pseudocode represented in the collection of trees, to address the potential performance problem.

18. The non-transitory computer-readable medium of claim 14, wherein the operations further comprise:

generating a bitmap matrix of strings from each leaf node of the input tree, wherein determining the form factors is for corresponding nodes at each subsequent level of the input tree based on the bitmap matrix.

19. The non-transitory computer-readable medium of claim 18, wherein a zero or a one digit in the bitmap matrix of strings indicates descending one level down a path and the depth corresponds to a number of the zeros or the ones to a right of a pointer in one or more corresponding strings in the bitmap matrix.

20. The non-transitory computer-readable medium of claim 18, wherein the operations further comprise:

splitting a string at a level of the input tree into two strings to determine whether the string in the bitmap matrix is spent; and responsive to determining that the string in the bitmap matrix is spent, discarding the string.

* * * * *